(12) United States Patent
Baldwin et al.

(10) Patent No.: US 10,404,865 B2
(45) Date of Patent: *Sep. 3, 2019

(54) DYNAMIC USAGE INEQUITY DETECTION AND/OR REMEDY

(71) Applicant: AT&T Mobility II LLC, Atlanta, GA (US)

(72) Inventors: Richard Baldwin, Emeryville, CA (US); Neil Marini, Marietta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,160

(22) Filed: Apr. 20, 2018

(65) Prior Publication Data

US 2018/0241885 A1    Aug. 23, 2018

Related U.S. Application Data

(63) Continuation of application No. 15/293,567, filed on Oct. 14, 2016, now Pat. No. 9,979,832, which is a
(Continued)

(51) Int. Cl.
*H04M 15/00* (2006.01)
*H04W 12/12* (2009.01)
(Continued)

(52) U.S. Cl.
CPC ........... *H04M 15/47* (2013.01); *H04M 15/00* (2013.01); *H04M 15/41* (2013.01); *H04M 15/73* (2013.01);
(Continued)

(58) Field of Classification Search
CPC ...... H04M 15/47; H04M 15/00; H04M 15/41; H04M 15/73; H04M 15/80; H04W 4/26; H04W 12/12; H04L 63/101
See application file for complete search history.

(56) References Cited

U.S. PATENT DOCUMENTS 5,027,388 A    6/1991  Bradshaw et al.
6,016,340 A *  1/2000  Bayraktar ................ H04L 1/06
                                                  370/244
(Continued)

FOREIGN PATENT DOCUMENTS

WO          97/37506 A1    10/1997
WO       WO-9737506 A1 *   10/1997   .............. H04W 8/06

OTHER PUBLICATIONS

Non-Final Office Action received for U.S. Appl. No. 12/577,372 dated Oct. 11, 2011, 18 pages.
(Continued)

*Primary Examiner* — Mehmood B. Khan
(74) *Attorney, Agent, or Firm* — Amin, Turocy & Watson, LLP

(57) ABSTRACT

An architecture that can dynamically detect and/or automatically remedy service usage inequities in a communications network is provided. For example, based upon a comparison of incoming call detail records (CDRs) to various subscriber information entities (e.g., service plan, blacklisted devices for the service plan, historic or current billing cycle usage, etc.), the architecture can identify when a usage inequity occurs or is likely to occur, substantially in real time.

20 Claims, 12 Drawing Sheets

Related U.S. Application Data continuation of application No. 14/593,559, filed on Jan. 9, 2015, now Pat. No. 9,503,585, which is a continuation of application No. 12/577,372, filed on Oct. 12, 2009, now Pat. No. 8,958,770.

(51) Int. Cl.
  *H04W 4/24* (2018.01)
  *H04L 29/06* (2006.01)

(52) U.S. Cl.
  CPC ............ *H04M 15/80* (2013.01); *H04W 4/24* (2013.01); *H04W 12/12* (2013.01); *H04L 63/101* (2013.01)

(56) References Cited

U.S. PATENT DOCUMENTS

| | | | |
|---|---|---|---|
| 7,062,024 B2 | 6/2006 | Kreckel et al. | |
| 7,620,162 B2* | 11/2009 | Aaron | H04M 15/73 379/111 |
| 7,644,038 B2* | 1/2010 | Pericas | G06Q 20/102 705/40 |
| 7,761,083 B2 | 7/2010 | Marsh et al. | |
| 8,019,683 B1* | 9/2011 | Swanburg | G06Q 20/102 370/259 |
| 2001/0051946 A1 | 12/2001 | Nishikawa | |
| 2002/0142752 A1* | 10/2002 | Chin | H04Q 3/0025 455/411 |
| 2002/0196919 A1 | 12/2002 | Ruckart et al. | |
| 2004/0005875 A1* | 1/2004 | Ko | H04W 12/12 455/410 |
| 2005/0079868 A1* | 4/2005 | Shankar | H04L 63/0823 455/435.1 |
| 2005/0090230 A1* | 4/2005 | Liao | H04L 12/14 455/406 |
| 2005/0111640 A1* | 5/2005 | Moisey | H04M 3/2218 379/114.2 |
| 2005/0154780 A1* | 7/2005 | Sarja | H04L 12/66 709/203 |
| 2006/0045245 A1* | 3/2006 | Aaron | H04M 15/73 379/111 |
| 2006/0229057 A1* | 10/2006 | Farrugia | H04W 24/08 455/403 |
| 2007/0150388 A1* | 6/2007 | Mendiratta | G06Q 30/00 705/35 |
| 2007/0201641 A1 | 8/2007 | Bar et al. | |
| 2008/0205381 A1* | 8/2008 | Zhu | G06Q 20/10 370/352 |
| 2008/0243655 A1* | 10/2008 | Cai | G06Q 30/0283 705/34 |
| 2009/0061863 A1* | 3/2009 | Huggett | H04L 63/101 455/434 |
| 2009/0068984 A1 | 3/2009 | Burnett | |
| 2009/0280777 A1* | 11/2009 | Doherty | H04M 1/66 455/411 |
| 2010/0190470 A1* | 7/2010 | Raleigh | G06Q 10/06375 455/406 |
| 2010/0195503 A1* | 8/2010 | Raleigh | H04L 41/0806 370/235 |
| 2010/0197266 A1* | 8/2010 | Raleigh | G06Q 50/06 455/406 |
| 2010/0197268 A1* | 8/2010 | Raleigh | H04L 12/14 455/408 |
| 2012/0203677 A1 | 8/2012 | Raleigh | |

OTHER PUBLICATIONS

Final Office Action received for U.S. Application U.S. Appl. No. 12/577,372 dated Aug. 17, 2012, 20 pages.
Non-Final Office Action received for U.S. Appl. No. 12/577,372 dated Apr. 16, 2013, 17 pages.
Final Office Action received for U.S. Appl. No. 12/577,372 dated Nov. 6, 2013, 14 pages.
Non-Final Office Action received for U.S. Appl. No. 12/577,372 dated Mar. 14, 2014, 13 pages.
Notice of Allowance received for U.S. Appl. No. 12/577,372 dated Oct. 9, 2014, 19 pages.
Non-Final Office Action received for U.S. Appl. No. 14/593,559 dated Oct. 6, 2015, 36 pages.
Notice of Allowance received for U.S. Appl. No. 14/593,559 dated Jul. 15, 2016, 37 pages.
Non-Final Office Action received for U.S. Appl. No. 15/293,567 dated Jun. 28, 2017, 31 pages.
Final Office Action received for U.S. Appl. No. 15/293,567 dated Oct. 12, 2017, 8 pages.
Notice of Allowance received for U.S. Appl. No. 15/293,567 dated Jan. 22, 2018, 40 pages.

* cited by examiner

DYNAMIC USAGE INEQUITY DETECTION AND/OR REMEDY

This application is a continuation of, and claims priority to each of, U.S. patent application Ser. No. 15/293,567 (now U.S. Pat. No. 9,979,832), filed on Oct. 14, 2016 and entitled, "DYNAMIC USAGE INEQUITY DETECTION AND/OR REMEDY", which is a continuation of U.S. Pat. No. 9,503,585, filed on Jan. 9, 2015 and entitled, "DYNAMIC USAGE INEQUITY DETECTION AND/OR REMEDY", which is a continuation of U.S. Pat. No. 8,958,770, filed on Oct. 12, 2009 and entitled, "DYNAMIC USAGE INEQUITY DETECTION AND/OR REMEDY". The entireties of these applications are hereby incorporated herein by reference.

TECHNICAL FIELD

The present application relates generally to communications networks, and more specifically to automatic or dynamic usage inequity detection and/or remedy.

BACKGROUND

Conventional communications networks that provide network services for subscribers based upon a contractual service agreement tend to provide various service plans, but do not investigate to determine if the selected service plans are suitable for the subscribers.

For example, a subscriber might have agreed to a feature-rich service plan or one with a very large number of minutes or other usage parameters, yet rarely use many of the available features or a significant portion of the provisioned usage allocation. Conversely, the subscriber might agree to a service plan that can be relatively inexpensively provided by the network because the service plan is tied to certain devices that are generally not capable of incurring substantial costs to the network through customary use. However, after such service is ordered, the terms agreed to by the subscriber can be violated, which can lead to substantial costs to the network. For instance, the subscriber can swap the subscriber identity module (SIM) from the provisioned device to an unauthorized one (or engage in device tethering or the like) that can take advantage of the services provided in a manner not intended by the network, and thus undermine the feasibility of low-cost service plans.

Currently, host networks do not have the ability to prevent such behavior after the ordering phase. In other words, the network provider can allocate service plans based upon devices identified during the ordering of service by the subscriber, but have no ability to detect the usage inequities noted.

DETAILED DESCRIPTION

Figure 1:
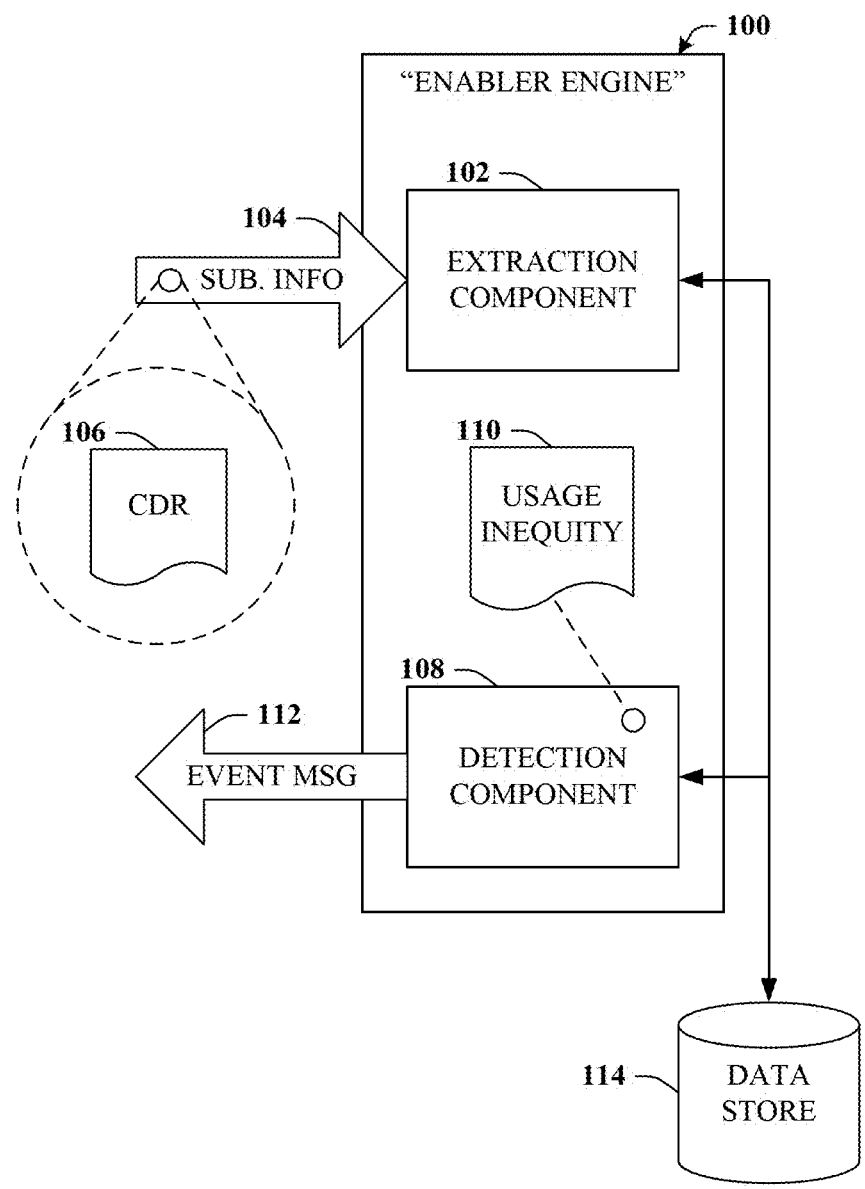
FIG. 1 is a block diagram of a system that can facilitate automatic and/or dynamic detection and/or remedy of service usage inequities in a telecommunications network.

The subject matter disclosed herein, in one aspect thereof, comprises an architecture that can facilitate dynamic detection as well as automatic remedy of service usage inequities in a communication network. In accordance therewith and to other related ends, the architecture can include an extraction component that can retrieve subscriber information associated with a subscriber to the communications network. The subscriber information can include one or more call detail record (CDR) associated with a communication transaction (e.g., voice or data) of the subscriber. In one or more aspects, the subscriber information can also include various other data such as rules data or provision data that includes data relating to at least one of a provisioned service agreement agreed to by the subscriber, enabled features associated with the service agreement, terms and conditions associated with the service agreement, other available service plans, historic usage for the subscriber, current billing cycle usage for the subscriber and so forth.

The architecture can also include a detection component that can examine the subscriber information. For example, the detection component can compare data included in the CDR to other subscriber information. Regardless, based upon this examination, the detection component can generate a data usage event message when a usage inequity is identified. In one or more aspect, the usage inequity can relate to avoidable high data usage charges deemed likely to arise during a billing cycle or otherwise. In these or other aspects, the usage inequity can also relate to the detection of a usage violation such as the detection of SIM swapping or device tethering or the like.

In one or more aspects, the architecture can also include a control service component that can receive the data usage event message, and that can determine, based upon rules data, a suitable treatment to apply in connection with the subscriber, generally in a manner intended to remedy or mitigate the usage inequity. In one or more aspects, the suitable treatment can relate to, e.g., transmitting a notification to the subscriber, wherein the notification can include one or more of the usage inequity, suggested remedies, potential actions should the usage inequity continue, or further contact information; additional or more detailed monitoring of data usages associated with the subscriber; a restriction to data usage or services associated with the subscriber; a termination of data usage or services associated with the subscriber, and so on.

As used in this application, the terms "system," "component," "interface," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Further, terms like "user equipment," "mobile station," "mobile," subscriber station," "access terminal," "terminal," "handset," and similar terminology, generally refer to a wireless device utilized by a subscriber or user of a wireless communication service to receive or convey data, control, voice, video, sound, gaming, or substantially any datastream or signaling-stream. The foregoing terms are utilized interchangeably in the subject specification and related drawings. Likewise, the terms "access point," "base station," "cell site," and the like, are utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or framebased flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, system 100 that can facilitate automatic and/or dynamic detection and/or remedy of service usage inequities in a telecommunications network is depicted. Generally, system 100 can include extraction component 102 that can retrieve subscriber information 104 associated with one or more subscribers to a telecommunication network. Typically, the communications network will be a wireless communication network, but it should be appreciated that the disclosed subject matter can also apply to substantially any type of telecommunications network. Subscriber information 104 can optionally include a variety of data or data sets, which is further detailed infra in connection with FIG. 2A. However, subscriber information 104 will normally include at least one or more call detail record (CDR) 106 associated with a communication-based transaction of the subscriber, such as a call, text, download, or substantially any other voice or data transaction.

CDRs (e.g., CDR 106) are typically produced automatically for a call or other transaction types, and typically include a source identifier (e.g., number or ID of the calling device), a destination identifier (e.g., number or ID of a called device), a time stamp, a duration, a transaction type (e.g., voice or data), and so forth. CDRs can thus be stored or archived by the host communications network or an agent or partner thereof, such as to data store 114. Accordingly, extraction component 102 can retrieve CDR 106 from data store 114 or from other network components. For example, in one or more aspects of the disclosed subject matter, extraction component 102 can retrieve CDR 106 from a General Packet Radio Service (GPRS) Serving Support Node (SGSN) associated with the communications network. Hence, extraction component 102 can retrieve CDRs as they are created or received by particular network equipment, devices or components; or retrieve CDRs from data store 114.

Data store 114 is intended to be a repository of all or portions of data, data sets, or information described herein or otherwise suitable for use with the described subject matter. Data store 114 can be centralized, either remotely or locally cached, or distributed, potentially across multiple devices and/or schemas. Furthermore, data store 114 can be embodied as substantially any type of memory, including but not limited to volatile or non-volatile, sequential access, structured access, or random access and so on. It should be understood that all or portions of data store 114 can be included in system 100, or can reside in part or entirely remotely from system 100.

Furthermore, system 100 can include detection component 108 that can examine subscriber information 104. Based upon the examination of subscriber information 104, detection component 108 can identify usage inequity 110, which is discussed in more detail with reference to FIG. 2B. Accordingly, when a usage inequity 110 is identified, detection component 108 can also generate data usage event message 112. Thus, data usage event message 112 can alert as well as describe one or more usage inequity 110 that can be derived from CDR 106 as well as from other subscription information 104, which can now be described.

Figure 2A:
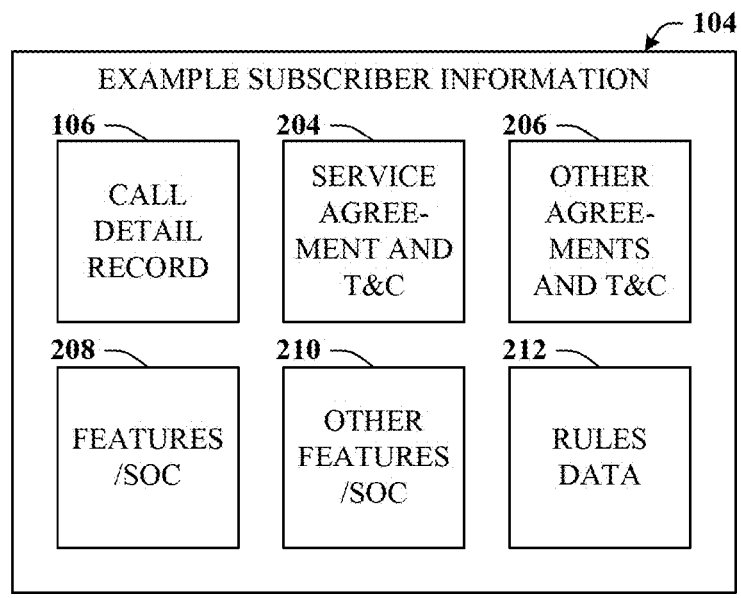
FIG. 2A provides a block diagram that depicts various example subscriber information 104.
Figure 2B:
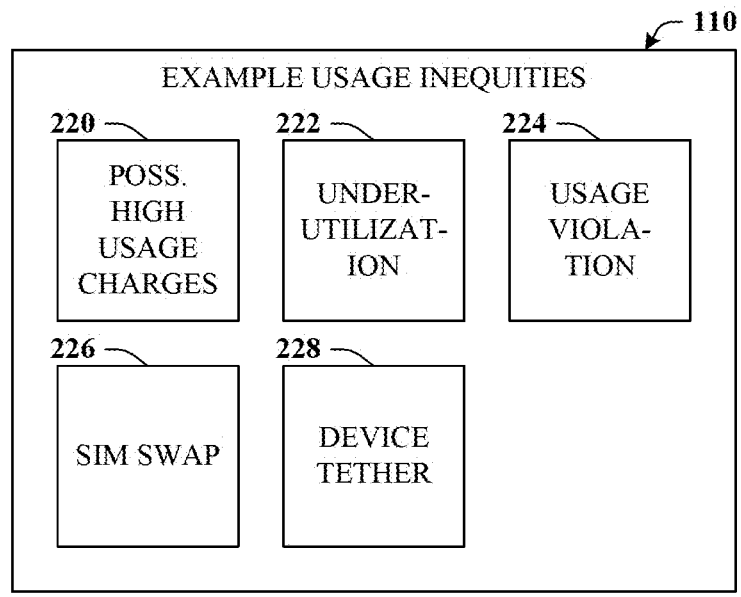
FIG. 2B depicts a block diagram that illustrates exemplary usage inequities 110.

While still referring to FIG. 1, but turning now also to FIGS. 2A and 2B, FIG. 2A depicts various example subscriber information 104, while FIG. 2B illustrates exemplary usage inequities 110. Referring specifically to FIG. 2A, as already mentioned, subscriber information 104 can be or can include CDR 106, which is intended to refer to a either a single CDR 106 or a collection or history of CDRs 106, such as those within a current or past billing cycle. Other examples of subscriber information 104 can include various provision data (denoted by reference numerals 204-210) that can be retrieved from an accounts data store (which can be included in or separate from data store 114) associated with the communications network, and rules data 212, which is further described in connection with FIG. 3.

Thus, while rules data 212 can be included in subscriber information 104, detection component 108 will commonly focus on comparisons between CDR 106 and provision data 204-210 in order to identify usage inequity 110. By way of illustration, provision data can relate to a service agreement and/or terms and conditions of a service agreement between the network and a network subscriber, which is denoted by reference numeral 204. Similarly, the provision data can relate to other service agreements such as those associated with disparate subscribers and/or to other available service plans, which is labeled by reference numeral 206. In addition, provision data can include various features, options, or service order codes (SOC) associated with the service agreement of the subscriber; or those features, options, or SOCs otherwise available or provided by the network, which are denoted by reference numerals 208 and 210, respectively.

Continuing on to FIG. 2B, one example of usage inequity 110 can be an avoidable high data usage charge, for instance, one that is deemed (e.g., inferred or determined) likely to arise during a billing cycle or otherwise, which is depicted by reference numeral 220. Another example usage inequity 110 can relate to usage that is more suitable for a disparate service or features thereof, labeled as reference numeral 222. For example, usage by the subscriber that consistent falls short of a current associated service plan or features thereof, or that consistently falls below a less expensive service plan can give rise to usage inequity 110. Such usage inequities 110, once identified, can be processed (discussed with reference to FIG. 3) and employed to proactively suggest a means for the subscriber to reduce costs associated with his or her current service plan.

Conversely, usage inequities 110 can also be identified when such relate to usage violations 224 in which usage of the communications network violates a provisioned service agreement or rate plan agreed to by the subscriber. Examples of usage violation 224 (and/or usage inequity 110) can be, e.g., a subscriber identity module (SIM) swap 226 or device tether 228. SIM swap 226 can occur, e.g., when a SIM for one device is switched with that for a second device, typically a second device that has a richer feature set. Likewise, device tether 228 can occur, e.g., when a first device is communicatively tethered to a second device, typically one with a richer feature set in order to employ the network provided by the first device. Both cases can result in a violation of the terms and conditions of a provisioned service and/or the service agreement agreed to by the subscriber, and can thus be identified as usage inequity 110.

Still referring to FIG. 1, detection component 108 can identify avoidable high data usage charges 220 by forecasting usage relative to an amount of time remaining in a billing cycle or by identifying usage by the subscriber that surpasses a respective threshold at one or more periods of the billing cycle. As for occurrences that can constitute usage violations 224, detection component 108 can convert an International Mobile Equipment Identify (IMEI) included in CDR 106 into an IMEI type. With this IMEI type, detection component 108 can then be appraised of the particular type or class of equipment employed for the communication transaction. Hence, this IMEI type can be compared to IMEI type or types of authorized or allowable equipment included in subscriber information 104 (e.g., provision data) or to IMEI type(s) included in a blacklist equipment list, also potentially included in subscriber information 104, that specifically enumerates equipment or devices that are prohibited from use with the subscriber's service agreement or rate plan.

It should be appreciated that usage inequity 110 can be identified substantially in real time. For example, usage inequity 110 can be identified contemporaneously with a communication transaction and/or with the creation of an associated CDR 106. In some cases, however, it can be beneficial to delay the examination or determinations of usage inequities 110, but even in such cases, determinations can be made within a 24-hour period. Regardless, such determinations or inferences associated with usage inequities 110 can be identified dynamically, without action or supervision by human actors. Moreover, it should be further appreciated that references herein to "Enabler rating engine," "Enabler system," or similar are generally intended to relate to system 100 or components or features thereof.

Figure 3:
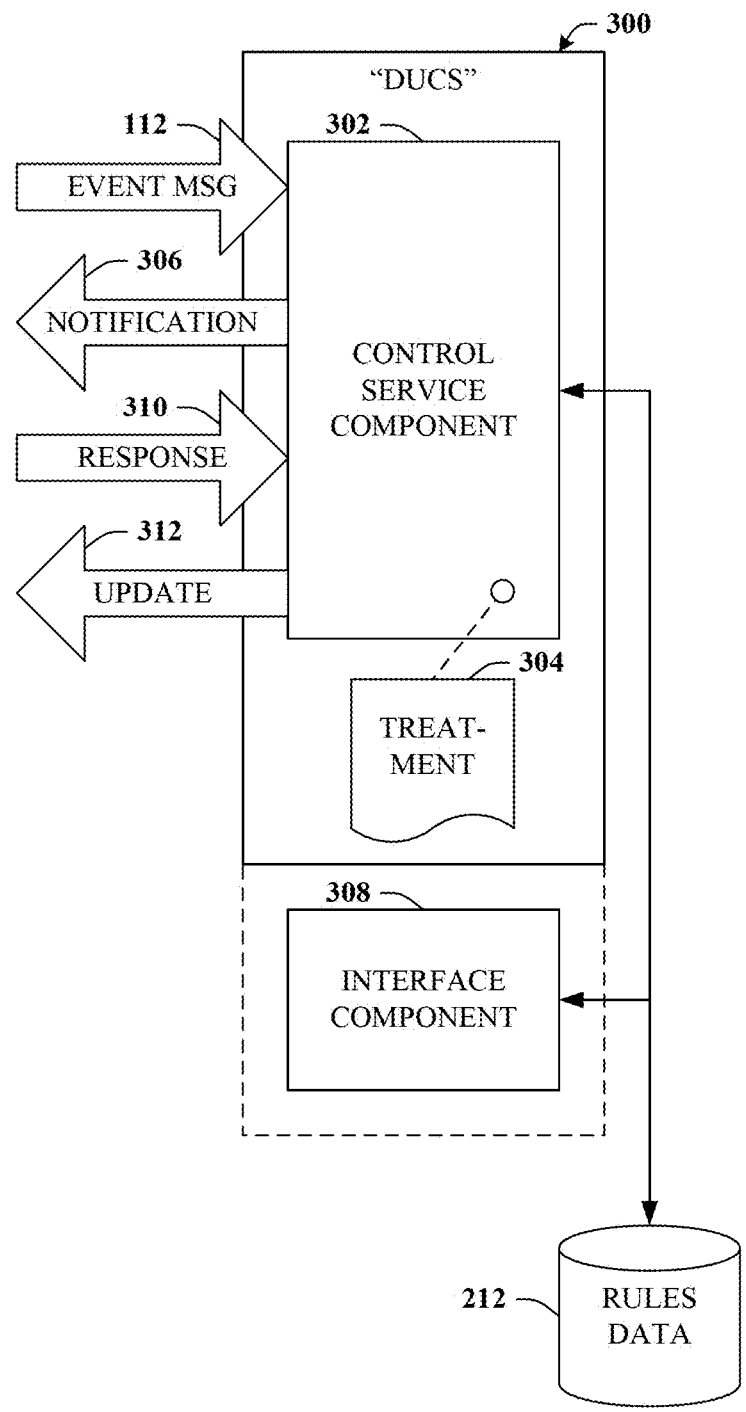
FIG. 3 illustrates a block diagram of a system that can determine suitable actions in response to data usage event message processing.

Turning now to FIG. 3, system 300 that can determine suitable actions in response to data usage event message processing is illustrated. In particular, system 300 can include control service component 302 that can receive data usage event message 112. Control service component 302 can process data usage event message 112 in connection with rules data 212 in order to determine or infer suitable treatment 304 to apply with respect to the subscriber (e.g., the subscriber associated with the one or more CDRs 106 that resulted in issuance of data usage event message 112 detailed supra). Control service component 302 can determine or infer a variety of possible treatments, which is further detailed with reference to FIG. 4.

Figure 4:
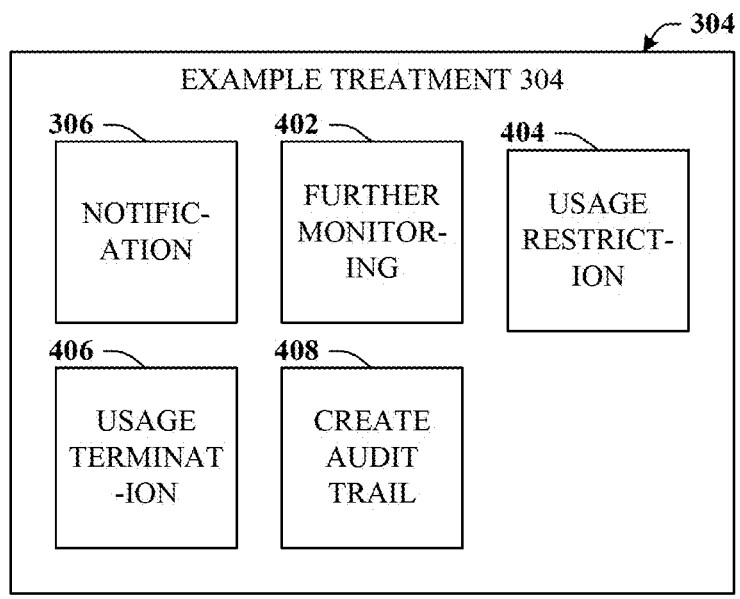
FIG. 4 is a block diagram of various example treatment 304 determinations.

While still referring to FIG. 3, but turning now also to FIG. 4, various example treatment 304 determinations are depicted. Initially, a first example of treatment 304 can be notification 306, illustrated here as well as in FIG. 3. Notification 306 can be issued by control service component 302 or by another component at the behest of control service component 302. Notification component 306 can be delivered to the subscriber and can include details relating to usage inequity 110 as any or all of the following or other suitable data: (1) a suggested remedy for usage inequity 110 (e.g., switching service plans, adding/removing associated features or options to provide a cost-benefit to the subscriber); (2) potential actions should conditions associated with usage inequity 110 continue (e.g., in the case of usage violations, notification of further monitoring 402, a restriction 404 or a termination 406 of service); (3) or further contact information (e.g., web or email addresses or phone numbers for customer care or the like).

Reference numeral 402 can indicate a determination by control service component 302 that additional or more detailed monitoring of data usages associated with the subscriber should be facilitated. On the other hand, usage restriction 404 can indicate control service component 302 has deemed it suitable to restrict data usage or services associated with the subscriber, while usage termination 406 indicates a determination that it is suitable to terminate data usage or services associated with the subscriber. It should be appreciated that while control service component 302 can determine treatment 304 such as further monitoring 402 of subscriber usage, or a restriction 404 or a termination 406 of service is appropriate in a particular case, any or all of which can be referred to in notification 306, the determination of whether or not to send notification 306 at all can also be made as well. Hence, creation and/or propagation of notification 306 also represent treatment 304 that can be determined or inferred by control service component 302.

For instance, even if control service component 302 determines any one of items 402-406 represent suitable treatment 304, notification 306 can be first selected notifying the subscriber of the possibility that such will apply in order to allow the subscriber to amend his or her behavior and/or violation of service terms and conditions. As another example, certain rules data 212 need not be applied automatically, even when processed. Thus, instead of taking particular actions immediately (sending notification 306 or applying other treatment 304), the rules data 212 can be tested for a time during a provisional period wherein an audit trail can be created to measure the effects (e.g., savings if the usage violation is corrected) of treatment 304 defined by a particular rule in rules data 212.

Still referring to FIG. 3, in one or more aspects of the disclosed subject matter, notification 406 can be transmitted to the subscriber by way of short message service (SMS), email, or regular, physical mail. While particularly convenient in the cases of SMS or email, but ultimately regardless of the method of delivery, control service component 302 can receive response 310 to notification 306. Response 310 can be particularly relevant to the cases in which usage inequity 110 relates to potential high usage charges or underutilization (e.g., reference numerals 220 and 222 of FIG. 2B). For example, consider the situation in which high usage costs are deemed likely within a billing cycle. Notification 306 can indicate this possibility as detailed supra, yet also identify a suitable service plan or feature or SOC that can accommodate the high data usage in a manner that can save the subscriber money. Similarly, in the situation of underutilization 222, notification 306 can alert the user (potentially based upon examination of the current and historic usage patterns) that a different service plan, e.g., one that carries a lower cost is suitable.

In either situation, the subscriber can be economically benefited, either by upgrading to a service plan or a SOC/features that avoids likely overages or by downgrading to a cheaper plan that still covers the subscriber's consistent usage patter, Hence, in either situation, notification 306 can indicate that the subscriber should modify a current service plan, which can be accomplished by agreement included in response 310. Thus, control service component 302 can automatically facilitate update 312 to a provisioned service agreement or associated features when the subscribers authorizes update 312 or when the subscriber requests an exemption in response to notification 306.

In addition, system 300 can also include interface component 308 that can enable authorized administrators to create or update rules data 212. As noted, rules data 212 can define how control service component 302 interprets data usage event message 112, whether or not to generate notification 306 or select other suitable treatment 304, and/or whether or not to apply treatment 304 or forego that treatment, e.g., in favor of facilitating an audit trail. Moreover, as indicated by the header, system 300 or components or features thereof can be referred to as "DUCS" or a "Data Usage Control" System or Service or similar. An example decision tree is provided in connection with FIG. 5 to indicate an exemplary processing of subscriber information 104 and determination of treatment 304.

Figure 5:
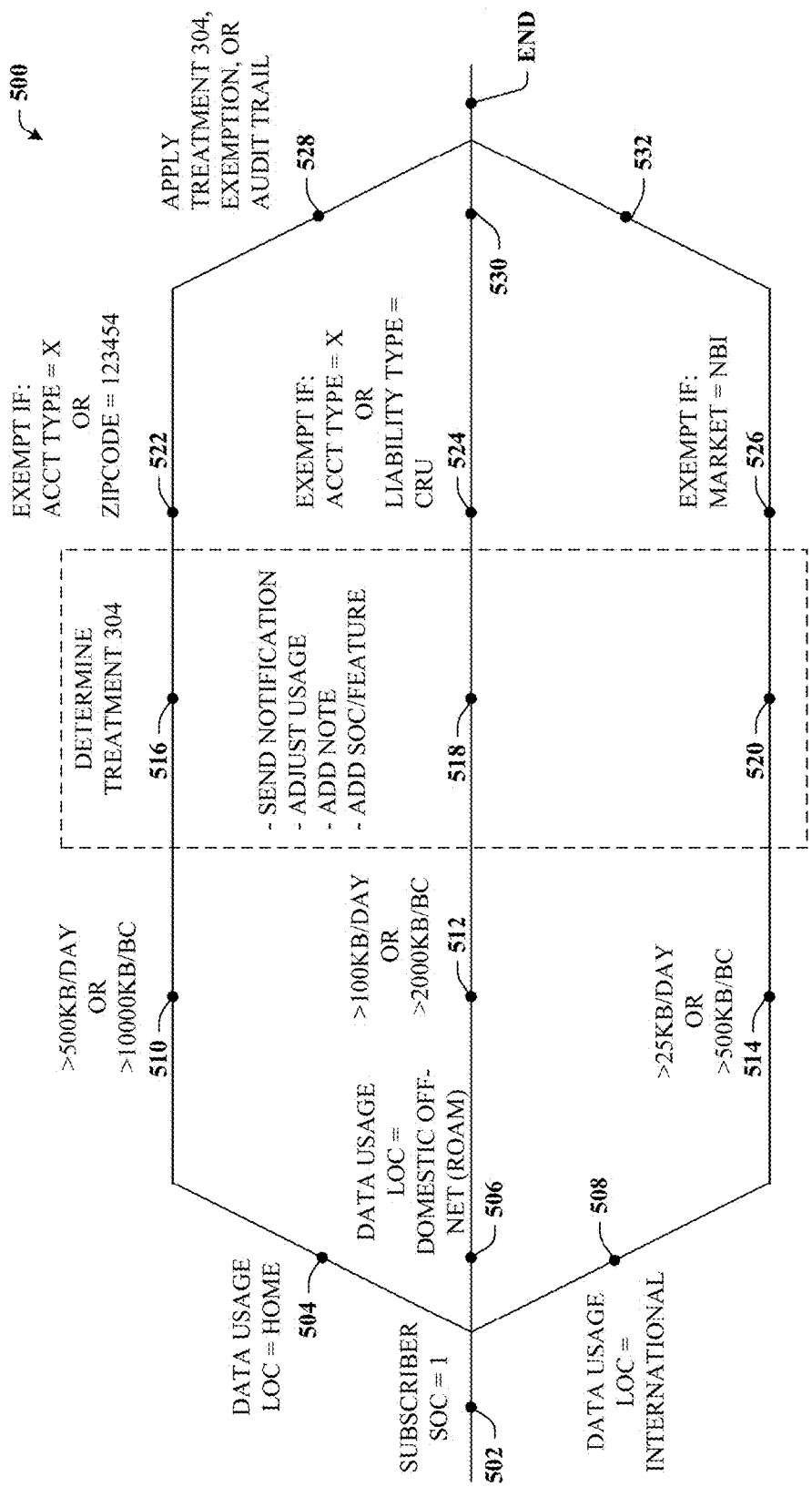
FIG. 5 provides illustration 500 depicts an exemplary decision path associated with a particular SOC.

However, before turning to FIG. 5, with the foregoing in mind, it should be readily apparent that the features detailed herein can, inter alia, provide a mechanism for proactively detecting avoidable high data usage costs during a billing cycle as well as service plan underutilization. In addition, the disclosed subject matter can also provide a mechanism for communications networks to ensure a subscriber is abiding by the terms and conditions agreed to in a service agreement, or to identify and react appropriately when such is not the case. Appreciably, in either case, the subscriber can be notified of any identified usage inequity (e.g., usage inequity 110), which can potentially be identified dynamically in substantially real time. Moreover, subscribers can be provided the ability to automatically update features or options or service agreements in response to the notification (e.g., notification 306) relating to the usage inequity or inequities identified.

Accordingly, disclosed subject matter can provide the capability to detect the nature of the equipment a subscriber is utilizing, compare that equipment type to the provisioned type, rate plan, features, rules, etc., and decide systematically whether to apply treatment (e.g., treatment 304) of some type, generally predefined. In more detail, the Enabler ratings engine (e.g., system 100 or components or features thereof) can pull the IMEI from a Call Detail Records (e.g., CDR 106) arriving from the network SGSNs, which can then be translated to an associated IMEI Type or class of equipment. Enabler can then compare the IMEI Type against the provisioned rate plan, features, and rules data such that if no match is found (or a match is found when comparing to an equipment blacklist), Enabler can compose an event (e.g., data usage event message 112) for use by DUCS (e.g., system 300 or associated components or features) for determining suitable treatment.

Likewise, DUCS can allow a certified administrator, governance council, rules board, or substantially any eligible body to author and promulgate various rules (e.g., rules data 212) that guide determining treatment 304. Such rules data 212 can be vetted and updated or promulgated in a consistent way, for example, uploaded nightly to be used by the billing system data rating engine, Enabler, as incoming data CDRs are rated. DUCS can receive event messages from Enabler that represent a detected rule violation or other usage inequity. The data payload of the message can contain the required data DUCS needs to properly evaluate the usage inequity and the treatment it might apply to the subscriber as a result. Appreciably, rules can enforce negative or positive treatment for any party, depending upon the particular scenario. For example, the communications network can choose to proactively guide a subscriber to a lower cost feature or it may penalize a subscriber for SIM swapping to a more capable device such as a laptop.

DUCS can notify the subscriber by way of SMS, email, or postcard, wherein the notification can include various types of information about the usage inequity. In addition, DUCS can also collect the affirmative response (e.g., response 310) such as a reply SMS, authorizing DUCS to upgrade or otherwise modify the subscriber's data service. In extreme cases of violations, DUCS can maintain the ability to shut off a subscriber's data capability entirely, or to restrict all or certain portions. Moreover, DUCS can also support a subscriber's request for a rule exemption. In some aspects, DUCS can permit a "soak" period and/or a provisional period, during which no treatment need be applied, but one in which an audit trail can be created that measures the impact of the rule if applied. Hence, effects of treatment can be inferred prior to implementation and the communications network can deliver rules data and treatment into production in relatively short period of time, such as, e.g., a week or two.

Accordingly, by employing the disclosed subject matter, numerous benefits can be provided for the subscriber as well as the host communications network. Such benefits can include: (1) an ability to warn subscribers of possible overage charges or underutilization; (2) an ability for the host network to detect subscribers who violate their accepted terms and conditions by SIM swapping to higher capable data devices; (3) an ability for the host network to detect subscribers who violate their accepted terms and conditions by tethering to higher capable data devices; (4) an ability for the host network to ensure that subscribers whose device types require specific provisioned features are actually provisioned with those features; (5) the ability for the host network to provide an exemption path for any subscriber to opt out of the automated treatment; (6) a simplification for marketing or other departments to deploy vetted rules into production with expedience; (7) an ability for subscribers to avoid high pay-per-use data usage charges after inadvertently or otherwise disabling a data feature.

In addition to the aspects and concepts developed above, a variety of exemplary implementation possibilities and/or further details in connection with the solutions provided herein will now be described. In general, it should be appreciated that all or a portion of the described aspects can leverage, to the extent possible behaviors normally ascribed to architectural elements in use today. Thus, there is no need to foster new crossover capabilities where it is unnecessary. For example, systems or components designed or utilized to normalize and mediate incoming CDRs can continue to do so, while Enabler can be assigned rating functions, and the billing systems or components can continue to be tasked with billing for usage. Hence, the high-volume tasks assigned to each of these components should be their only tasks, while assigning more mundane utility tasks to other applications or components better suited to handle them.

As discussed supra, a few of the key objectives are to, e.g., evaluate the combination of the end-user device in use, the rate plan, data features, and all pertinent rules that regulate this combination, and to apply treatment, if necessary, or respond to the calling client with data indicating which type of treatment is required. The aspects described can follow patterns already established and optionally enforced by Device Eligibility Rules (DER), such as detection, rules evaluations based upon the device, and assignment of treatment. Unlike DER however, which tests whether a certain combination of device, plan, and/or features is compatible during the ordering phase (e.g., initial sign-up), the treatment service will evaluate how the subscriber is using the provisioned data service, whether pertinent rules are violated, and whether to apply treatment.

Notably, the described subject matter offers the host network an accessible and highly configurable set of rules, attributes, and treatment behaviors whose management is not necessarily tied to software releases or deployments. Ideally, the strategic value of the treatment service should offer information technology or related departments a wider spectrum of treatment possibilities than what is disclosed herein.

The following sections decompose one or more aspects of the disclosed subject matter in a manner intended to underscore and further examine functional portions or components.

Detection

A fundamental question must be answered as to whether information technology departments should react upon the detection of a device swap or whether it should wait until the device is used in violation of a set of rules. What is described herein is generally formulated with the latter objective in mind. Thus, while the subject matter detailed can be applied for such purpose, this disclosure is generally directed to cases in which it is chosen not to use available data to evaluate the intent of the subscriber to misuse the device and/or violate service agreements. It can be recognized that inherent latencies between mediation and results generated by Enabler, and further that treatment can be applied after a violation has been detected and evaluated.

Accordingly, detection should be performed by Enabler as it receives the data EDR's (CSG-CDR and G-CDR). The suggested method to detect SIM swapping is for Enabler to compare the IMEI on the incoming CDR to the IMEI in an IMEI Master List. If found, then Enabler should compare the device's IMEI Type to the IMEI Type on the blacklist for the subscriber's rate plan or data feature. If the IMEI Type is not found on the blacklist for the provisioned rate plan or data feature, then no action is required. If it is, then a treatment evaluation must take place.

For the sake of economy, Enabler can cache the results of its initial detection whenever it detects the IMEI Type in use is on the blacklist for the subscriber's rate plan or data feature. Additionally, or alternatively, mediation departments or components can also be able to detect when a SIM is being used in a device that is blacklisted on the rate plan or data feature; however, these features normally should be handled by Enabler rather than mediation.

Threshold detection normally should also be performed by Enabler to support Data Roaming Controls. The thresholds can be configured through the treatment service administrative interface with a variable number of threshold parameters—as well as the daily and billing cycle thresholds. Enabler should receive these and all global parameters from the treatment service on a daily basis as reference data. Enabler should use the threshold parameters to trigger a treatment event to the treatment service when the data roaming thresholds are breached.

Mediation

Network elements transporting data can provide IMEI data to mediation components. Mediation can pass Enabler the IMEI when it receives it in data CDRs.

Rating

The host network service agreements can provide that subscribers to products without DER enabled will not usually receive treatment under various billing rules. Similar requirements might also provide that the host network can select one or more existing plans or features that must receive treatment immediately. And finally, certain requirements might even restrict information technology departments or components from conducting sweeps to replace the specified subscriber's plans or data features with those that are DER enabled.

However, Enabler's real-time ability to detect when subscribers are generating data when using an IMEI not eligible for use according to the rate plan or data feature's blacklist, make it possible to apply treatment to all subscribers, not just to those provisioned with new products.

In support of differential billing, the host network can use the treatment service's administration interface to add any existing products it has selected for differential billing.

When Enabler detects that the IMEI Type in use is also on the blacklist for the subscriber's rate plan or data feature, Enabler can send an event to the treatment service for evaluation (e.g., DUCS). The treatment service can use the "DER Enabled" flag to determine whether to apply treatment. If the IMEIs are mismatched and the "DER Enabled" flag is set, the treatment service can automatically apply a designated treatment.

Data usage records (e.g., CDRs) rated by Enabler can contain some form of SIM swap indicator when appropriate, the IMEI device type should be entered into the event record, the date and time in the market of origination for the usage, and the charged differential rate for the usage. For these and other aspects, Enabler is not necessarily testing the device, rate plan and features against DER. Rather, Enabler can facilitate sending the transaction to the treatment service for evaluation of treatment options per business rules.

Differential Rate

Differential rates are another type of billing rate applied under a set of variable conditions. Where the included and overage rates are familiar, the differential rate can be applied as a penalty when differential billing rules are violated.

Differential rates can be maintained via the administration a graphical user interface (GUI) for the Treatment Service, and can be applied to event records by Enabler. A differential rate and a maximum charge amount can be supplied by the treatment service as reference data to Enabler. After an evaluation has determined that the rate must be applied to the subscriber's current data usage, Enabler can apply the differential rate. Enabler generally should use this higher rate thereafter as long as the incoming IMEI, the rate plan or data features, and the IMEI Type in the blacklist remain unchanged, and/or until reaching the maximum charge limit for the billing cycle.

When the Subscriber's maximum charge limit has been met for a billing cycle, the differential rate will often expire. All other roaming and non-Differential Billing charges can continue to be applied as usual. When a new billing cycle commences, the maximum rate charged should normally be reset to zero. However, the differential rate should be applied immediately if the conditions for its application haven't changed from the previous month. If the subscriber has fallen into compliance before the previous billing cycle date, then the differential rate will not apply at the outset of the new billing cycle.

When a subscriber replaces the device, or modifies the rate plan or data features, Enabler can retest the incoming IMEI in the manner describer above. If the IMEI Type continues to violate the blacklist restriction, Enabler can again send an event to the treatment service for treatment evaluation.

In some cases, a subscription may have various exemption SOC/features on it. If present, one SOC/feature can, e.g., inform the treatment service to send no notifications to the subscriber. Another SOC/feature, if present, can, e.g., inform Enabler not to charge the differential rate and to return to charging the rates (in-bucket and out-of-bucket) provisioned on the data SOC/feature.

Data Roaming Thresholds

The host network may optionally require multiple subscriber thresholds for roaming data usage and multiple evaluation time periods. Such data usage thresholds can be adapted for ready configurability and when modified, can apply in near real-time or at least once per calendar day. The data roaming thresholds can be evaluated at the subscriber level when CDRs are being rated or re-rated.

The threshold parameters that define when a threshold is breached can be listed here as categories of usage. When the maximum value in any category is reached, the threshold will have been breached. Such categories of usage can include, for instance:

Total domestic usage on-net
Total domestic usage off-net
Total usage on-net
Total usage off-net
International Moreover, Enabler can record the PLMN of the off-net carrier when the off-net data usage threshold is reached. Data Roaming Controls rules for treatment can be applied by the treatment service. If an event is to be sent to the treatment service, Enabler will supply enough data to describe the event, to identify the subscriber, the private land mobile network (PLMN) of another carrier for off-net data usage, and/or any other pertinent data required by the service.

Enabler should continue sending the treatment service the threshold events, even after an exemption feature has been added to the subscription. Data attributes in this event will generally emerge from the High-Level Design phase of implementation of the disclosed subject matter.

Billing

Selected products can also contain a list of one of more compatible devices (white list) as is conventional. These lists should appear on products in the formal SID form. Products that require DER enforcement should be created as such with the "DER Enabled" flag on the SID form set to true. DER currently prohibits ineligible device, rate plan, and/or feature combinations during the Ordering phase.

Several products will be created that can act to exempt the subscriber, TCM, account owner, and non-DCS Reseller from receiving threshold notifications triggered by Data Roaming Controls. One exemption product can relate to a time-to-live for as long as the current billing cycle. A second product can be configured to have no expiration. Enabler may need multiple rates: one for detected SIM swapping, another for detected tethering, and other rates for differing situations.

Applicable usage charges can continue to accrue while the Subscriber is in violation of rules. Moreover, reports may be requested by the host network to measure the scope and effectiveness of any given program. In addition, notes added to the subscriptions as part of this program can flow to BID for future reports as they may be defined.

Bill Presentation

The detailed display of billed and unbilled differential usage charges on various interfaces, whether in print media or on graphical user interfaces, can be configured to indicate when a SIM swap was detected, the device used, and the charged differential rate. This information can be used by the Subscriber, TCM, account owner, non-DCS Reseller, Customer Care Reps, and Sales Reps. This bill should display a new summary line for the differential billed usage and separate data detail sections to call out the different categories of prohibited events such as, e.g., prohibited SIM Swapping of Blackberry-like device, prohibited tethering of PDA-like device, and so forth. The following list of user interfaces that display detailed unbilled and billed data usage can be required to be capable of displaying the information described above.

TLG CSM
Care client
PRM
OPUS
PDC1
PDC2
Premier Online Care (POC)
Premier
Phoenix
eBPP
OLAM BMG accounts that have contracted to receive their statements on WinCD can also be able to readily see such information. A notification of data suspension can be sent when the treatment service suspends the data service. The subscription can be noted whenever a notification is sent. The note can be added using a reason code, and if necessary, a primary reason code to further describe why it was added. These codes should be unique for the disclosed subject matter; however, in some cases existing codes can be employed.

Subscribers who use OLAM to view their statement and/or unbilled data usage should be able to view the list of notifications sent to them as a result of Data Roaming Controls enforcement. Subscribers whose data usage was restored from suspension should not be able to see the notifications that lead to the recent suspension when using the OLAM screen to view their account. Anytime the notification list is reset, the OLAM view of the Subscriber's account must no show previous notifications.

Customer Care and Sales

The Data Roaming Controls treatment can consist of sending notifications, either or both SMS or email, based upon rules that define thresholds and the time of day to send the notifications. The host network can provide flexibility in this area, which can be managed by the network through the treatment service's web based GUI. Notifications can be sent according to rules previously described; however, a customer support representative (CSR) may add an exemption SOC/feature to the Customer's subscription effectively turning off the notifications for a specific time period. A CSR may also add an exemption SOC/feature to force Enabler to rate data usage at the provisioned SOC/feature rate rather than at the differential rate.

Depending on the pertinent methods and procedures (M&Ps) for this purpose, a CSR may add either an exemption feature that has billing cycle duration, or one that never expires. These time-based exemption feature products should be configured in SID to be exclusive of each other. The Indirect or Agent Sales clients (PDC1 and PDC2) might be required to refuse to permit their users to either assign or to remove the exemption features.

When the CSR adds or removes a notification exemption SOC/feature, Customer Care and Retail Sales clients can pop a dialogue box that must be acknowledged before the Rep may continue. The text in the dialogue must tell the Rep to notify the Subscriber, TCM, account owner, or non-DCS Reseller that the responsibility to pay all data usage charges remains theirs. Text box language can be provided by the business.

National Billing Operations, Retail Sales Reps, and Clarify Reps must be able to view the SIM swap indicator and the exemption SOC/features to support dispute resolution. Retail implementations of the disclosed subject matter should also translate the device type to an English common name such as Blackberry or PDA or Lap top card.

Common Treatment Service (Data Usage Control Service (DUCS))

While DER can be contained within the billers, the test it conducts can prohibit incompatible or ineligible device, rate plan and/or feature combinations during the Ordering phase. Unfortunately, in conventional platforms, this test often occurs too late in the Ordering phase and causes numerous avoidable exceptions when a violation is detected. In addition, this contributes to a poor Customer experience just when the Company is trying to make a good first impression.

The Common Treatment Service (CTS) is a new highly-available, disaster-recoverable service application. It can behave much like DER, but it can evaluate provided data against its rules set only after the device has been put into use on our network. Appreciably, the CTS can in some implementations fill the roll of DER, emerging as a much needed Decomposition Service to better suit I/T needs. CTS can receive data from Enabler, evaluate it against its rules, send events to the billers to add notes and SOC/features, and deliver reference data to Enabler for its use. Treatment is a core functionality of this service; much like normalizing and mediating CDRs is the core function of the Mediation Service.

CTS Product Repository

CTS can receive new products created through the SID process, especially those with the "DER Enabled" flag set to true. The CTS Administrator will store the data from the SID necessary for CTS to perform its mission. The SOC/feature product that will be applied when the Subscriber's data usage reaches the defined thresholds must be created by the Business. Any implementation of the disclosed subject matter should support adding variables so the same product can be defined and reused in various ways for each threshold.

The supported variations of what this product can do are in the list below. CTS must support the placement of attributes on the product as it is sent to CSI to be placed on the subscription. The billing systems should recognize the attributes and convert them into the already defined Switch Control events, such as:

Data restriction—all data, on and off net
Roaming restriction—all data and voice, all off net
Roaming restriction—all data and voice, international off net
Service suspension—all service on and off net
Service suspension and hot lining Products that have device exclusions on them (in the form of a device blacklist) and permitted inclusions (device white list) will be extracted from the SID form and put into the CTS database. Products whose attributes will be used to enforce Smart Data Controls are required to have a differential rate parameter. This parameter will be stored in the CTS database, but will be editable by the Business through the CTS user interface.

The host network generally must have complete control over the differential rates to be charged, markets and sub-markets, account types and sub-types, specific zip codes, and device blacklists and white lists that cause or condition the application of treatment. Similarly, the network usually must be able to control the daily and billing cycle data usage threshold levels by total domestic off-net usage, total domestic on-net usage, total off-net usage, total on-net usage, and international usage.

The product database must also include the current master IMEI range table made available by Supply Chain. A recurring job must reliably fetch this list. A CTS flag may be required on each applicable product for future use and to decouple the DER products from usage treatment behavior. The HLDs should address this possibility after thoughtful consideration. An example of the need for this decoupling has emerged from Business Requirement DB.006, which requires that products have types assigned to them. Currently, the SID process may not assign the required product types.

CTS Rules Repository

CTS rules should be stored in a database for easy maintenance, but should be cached in memory for use. Rules should be assigned reference numbers; e.g., (000-000) and priority numbers (00). CTS rules should be expressed, editable, and viewable using common rules syntax. The user interface should make maintenance simple, accessible, secure, and auditable.

Exemptions to rules can be permitted. These exemptions should apply to the following criteria: Account type, account sub-type, BAN or account number, FAN, or dial-able number. More exemptions may be provided over time by the Business. Adding rules through the user interface should support adding one rule or adding a group of affiliated rules.

The interface should support setting rules to active or inactive at the BAN or account level, Subscriber level, on specific rate plans and SOC/features, and on specific rate plan or feature types. Such settings should become effective in near real-time locally and at least once per calendar day via a nightly sync with Enabler. Conditional and configurable scoping parameters may also apply at various times to guide CTS in how and when to apply treatment. The parameters listed below and their values may be configured through the treatment service administrative interface. The parameters need not be designed to be unique and may occur many times in various combinations with other parameters, such as:

Rate plan
Account type
Account sub-type
Liability (IRU or CRU)
Owner Code (Applies to DSC Resellers)
Device type (IMEI Type)
Tenure
Billed data in the previous billing cycle
All markets
Select markets
Select sub-markets
Zip code Rules and related actions may be created at any time in the treatment service. The nightly sync-up of various rules and thresholds between the treatment service and Enabler is expected to occur only once per day. Therefore, if Enabler fails to properly handle some criteria, or if it uses out-of-date criteria, the treatment service can evaluate the event against the current rule and will invoke the correct action. The application of rules should be recorded in the CTS database for reports that may be required as part of this project. Reporting schema should be supplied by the host network.

CTS Programmatic Interface

CTS should expose its methods using a common simple object access protocol (SOAP) interface. The SOAP can build various interface methods to support its mission. The CTS team should publish its schema, create on-boarding kits, and generally support developers to enable its use. The input data should consist of these optional and required elements: IMEI, IMSI, BAN, billing cycle date, threshold number (i.e. 1-n), unbilled data usage, and the billed data usage from the previous billing cycle. The CTS output data should consist of optional and required elements; for example, a unique sequence number and the result of the rule evaluation. CTS should expose a public method that returns the treatment history by Subscriber for reporting purposes. The call might require an optional date that constrains the volume of data returned to the calling client.

CTS Native Capabilities

At the core of CTS is a rules engine, a set of rules, and a list of treatment actions. The recommendation of this solution is to reuse the same technology currently used by BMG and the Common Product Catalog (CPC). Rules in CTS should evaluate provided data and, when necessary, apply a treatment and/or respond with treatment data to a calling client. For example, CTS must expose a programmatic interface that can receive events from Enabler containing data it will evaluate against existing rules.

CTS should have an accessible and secure graphical user interface for those responsible to manage the rules and treatment actions for this program. CTS must use the AIM security framework to provide authentication access controls to this service application. CTS will also want to create local authorization controls to manage roles. CTS rules and data must be easily configurable and then applied in real-time or on a configured effective date. Rules should be easily set to expire on a configured date as well.

Notification messages can be stored in CTS as treatment data. The content of the messages must be easily editable through the user interface. Each notification message must include attributes that support a range of time each day the message may be sent, as well as the number of times per day or per billing cycle that the message may be sent. CTS should be able to call several CSI methods as required to fulfill its treatment mission. For example, if a treatment prescribes adding a SOC/feature or a note to a subscription, CTS will call CSI's UpdateSubscriberProfileRequest( ) or AddNote( )) methods, respectively, to perform this action.

CTS can be enabled to send notifications through CSI to the Enterprise Document Delivery system (EDD), a system that will send SMS and email messages. EDD can also send regular mail, such as postcards, should it become necessary when the first two methods are unavailable. The source of the email address must come from the following locations in the sequence provided:

CRU—BAN, BASE account, subscription
IRU/Consumer—subscription, BAN
DCS Resellers (e.g., Concord, Northstate, Home Telco and Farmers)—DCS Reseller account CTS should be able to send language-specific notifications, depending on the Subscriber's indicated preference. CTS can observe a configured time of day when a notification must be sent. The time of day should be relative to the time in the Subscriber's market and sub-market. System time should be mapped to each market and sub-market using GMT plus the offset. This will make it easier to deploy CTS into multiple data centers without regard to system time. CTS can generate a unique sequence number. This artifact verifies that CTS was used to evaluate the provided data and will satisfy the implied workflow requirement. In addition, CTS can log all rule evaluations and treatments, and record rule evaluations even though treatment may not have been applied.

Notification Messages

This section describes the construction and type of notification messages that can be utilized by the disclosed subject matter. In particular, notifications can relate to:

Email notifications that can include the dial-able number on the subject line.
Notifications can include an AT&T callback number.
SMS and email notification message content will be provided by the Business using the CTS graphical interface.
The content of SMS and email notifications will be editable by the Business using the CTS user interface.
Notification EDRs for messages sent under this program will be dropped by Enabler.
The requirements for differential billing limit to one the number of times per day that message notifications may be sent.
Differential billing message notifications may be sent each day of a billing cycle while a violation persists up to a configurable maximum number of times. The Business will be able to set this maximum number using the CTS user interface.
The message notifications will be counted as they're sent during each billing cycle. The count will be reset on the billing cycle date.
Notifications must be sent immediately and no later than 24 hours after the rule violation was detected.

CTS Treatment Behavior for Smart Data Controls

This section will describe the scope of treatments CTS may apply as required by this project.

A rule generally must determine the eligibility of the combination of the "DER Enabled" flag, the rate plan or data features, and the device being used. The input data should consist of the billing cycle date. The response to the calling client generally must include a violation code, and the unique sequence number. If the evaluation of the combination violates rules, then treatment will be applied as follows:

A pertinent SMS must be sent immediately to the Subscriber's device.
A pertinent email must be sent immediately to the appropriate email address.
If Subscriber belongs to a DCS Reseller, the pertinent email must be sent immediately to the Reseller address.

For the following threshold rule violations, CTS must apply treatment. The list of thresholds may be expanded beyond the examples in the list below.

Threshold 1—For DCS Resellers, send an email notification to the Reseller.
Threshold 1—For non-DCS Resellers, send an SMS to the Subscriber's device.
Threshold 1—For non-DCS Resellers, send an email to the Subscriber's email address.
Threshold 1—For non-DCS Resellers, send an email to the BMG BASE account's TCM email address.
Threshold 1—For non-DCS Resellers, send an email to the account owner.
Threshold 1—For all Subscribers, optionally apply a SOC/feature to the subscription. This SOC/feature will be described by the Business.
Threshold 2—For all Subscribers, add a SOC/feature to the subscription.
Threshold 2—For DCS Resellers, send an email notification to the Reseller.
Threshold 2—For non-DCS Resellers, send an SMS to the Subscriber's device.
Threshold 2—For non-DCS Resellers, send an email to the Subscriber's email address.
Threshold 2—For non-DCS Resellers, send an email to the BMG BASE account's TCM email address.
Threshold 2—For non-DCS Resellers, send an email to the account owner.

Notification messages required for differential billing tests must be sent only once per billing cycle to the account owners, telecom managers, and DCS Resellers. Anytime a notification message is sent, a note describing the fact should be added to the subscription. An IMEI that cannot be identified using the IMEI Master list can be authorized by default to generate data usage without treatment. Notification messages can be sent when required, even when both thresholds are reached within a short evaluation period.

CTS should send an event to the Fraud application when the first threshold has been reached. The message protocol and schema should be defined by the fraud application team. Data supplied in the event should include data from the following attributes:

Unbilled data usage by location (on-net, off-net, international)

Time period (daily or billing cycle)

PLMN of the other carrier at the point the roaming threshold was reached

If available, Subscriber's rate plan and data features, Account type and sub-type, liability type, device type, tenure, total billed usage in the previous billing cycle.

Reporting

All reports containing detailed data usage should capture the SIM swap indicator.

Interfaces

Enabler can create a private interface that can receive responses from CTS. In addition, Enabler should respond to calls for unbilled data usage by providing an optional device friendly name, and SIM swap and tethering indicators.

CTS can create a public, secure interface that will receive events from Enabler.

CSI may be impacted if it is required to make its private email method public for this project. Will need to transport the device friendly name on one or more calls (especially the InquireUnbilledusage( ) call). May also need to transport the SIM and tethering indicators in the same calls. Will need to transport the optional TCM email address in the response to the InquireFANProfile( ) call. Will need to handle the TCM email address coming back from the BASE FAN profile stored procedure call.

CAM typically will need to transport the device friendly name on one or more calls. Furthermore, CAM can also be required to transport the SIM and tethering indicators in the same calls; and might need to respond to an inquiry for all notification notes, or notes by reason code or primary action code added to subscription during a specified billing cycle.

iPOS generally will need to transport the device friendly name on one or more calls. Additionally, iPOS can also be required to transport the SIM and tethering indicators in the same calls.

CEF can transport notes, reason codes, and/or primary action codes from CAM for inquiries made by OLAM.

New Application(s) and/or Potentially Impacted Systems

TLG CSM—Applications that have billed and unbilled screens must display the differential rate when applied. If not currently doing so, must display the friendly device name used to generate the differential charge and the SIM swap and/or tethering indicators when present. Provide a pop-up dialogue box when CSR adds or removes an exemption feature.

Provide a pop-up dialogue box when CSR removes a data suspension SOC/feature. The pop-ups should be acknowledged by selecting a checkbox.

Care client—Applications that have billed and unbilled screens must display the differential rate when applied. If not currently doing so, must display the friendly device name used to generate the differential charge and the SIM swap and/or tethering indicators when present. Provide a pop-up dialogue box when CSR adds or removes an exemption feature.

Provide a pop-up dialogue box when CSR removes a data suspension SOC/feature. The pop-ups should be acknowledged by selecting a checkbox.

PRM (DCS Resellers)—Applications that have billed and unbilled screens must display the differential rate when applied. If not currently doing so, must display the friendly device name used to generate the differential charge and the SIM swap and/or tethering indicators when present. Provide a pop-up dialogue box when CSR adds or removes an exemption feature. Provide a pop-up dialogue box when CSR removes a data suspension SOC/feature. The pop-ups should be acknowledged by selecting a checkbox.

OPUS—Applications that have billed and unbilled screens must display the differential rate when applied. If not currently doing so, must display the friendly device name used to generate the differential charge and the SIM swap and/or tethering indicators when present. Provide a pop-up dialogue box when CSR adds or removes an exemption feature. Provide a pop-up dialogue box when CSR removes a data suspension SOC/feature. The pop-ups should be acknowledged by selecting a checkbox.

PDC1—Applications that have billed and unbilled screens must display the differential rate when applied. If not currently doing so, must display the friendly device name used to generate the differential charge and the SIM swap and/or tethering indicators when present.

PDC2—Applications that have billed and unbilled screens must display the differential rate when applied. If not currently doing so, must display the friendly device name used to generate the differential charge and the SIM swap and/or tethering indicators when present.

Premier Online Care (POC)—Applications that have billed and unbilled screens must display the differential rate when applied. If not currently doing so, must display the friendly device name used to generate the differential charge and the SIM swap and/or tethering indicators when present. Must display new note regarding data suspension.

Premier—Applications that have billed and unbilled screens must display the differential rate when applied. If not currently doing so, must display the friendly device name used to generate the differential charge and the SIM swap and/or tethering indicators when present. Provide a pop-up dialogue box when CSR adds or removes an exemption feature. Provide a pop-up dialogue box when CSR removes a data suspension SOC/feature. The pop-ups should be acknowledged by selecting a checkbox. Must provide viewing access to SOC/features dealing with exemptions and suspension, but must disallow TCMs from provisioning or de-provisioning these SOC/features.

Phoenix—Must display new note regarding data suspension. Provide a pop-up dialogue box when CSR adds or removes an exemption feature. Provide a pop-up dialogue box when CSR removes a data suspension SOC/feature. The pop-ups should be acknowledged by selecting a checkbox.

eBPP—Applications that have billed and unbilled screens must display the differential rate when applied. If not currently doing so, must display the friendly device name used to generate the differential charge and the SIM swap and/or tethering indicators when present. Must display new note regarding data suspension.

OLAM—Applications that have billed and unbilled screens must display the differential rate when applied. If not currently doing so, must display the friendly device name used to generate the differential charge and the SIM swap and/or tethering indicators when present. Must display new notes regarding data suspension. Must display notifications sent to the Subscriber during the billing cycle. Must clear notifications sent during the billing cycle if they exceed their effective time (i.e. daily notifications). Must clear notifications if the Subscriber resumes service after suspension.

Enabler—Must interact with CTS to properly apply treatment. Must send an event to CTS when necessary to apply treatment for data roaming threshold breaches. Must identify Subscriber's by account, account type, or SOC/feature in order to exempt these Subscribers from being billed at the differential rate. Enabler will use reference data supplied by CTS for this purpose. Must translate an EDR's IMEI to IMEI Type using the IMEI Master List. Must compare IMEI Type with the IMEI Type on the blacklist accompanying the Subscriber's provisioned data product. Must add two columns for SIM swap indicator and Tethering. Must map the IMEI of the device used to a friendly device make and model and add it to the event record.

Mediation—Must pass the IMEI in EDR's to Enabler.

Common Treatment Service—New service application

CARE billing system—Must save SIM and tethering swapping indicator.

Must provide these indicators for detailed bill presentation. Must accept data service suspension feature/SOC and its dynamic parameters and send the appropriate control data to Switch Control.

TLG billing system—Must save SIM and tethering swapping indicator. Must provide these indicators for detailed bill presentation. Must accept data service suspension feature/SOC and its dynamic parameters and send the appropriate control data to Switch Control.

CSI—Must on-board CTS, a new service application. May also be required to make an email method public. Must transport the optional device "friendly name" (make & model) in response to clients calling CSI's InquireUnbilledUsage( )method. May be impacted to transport the optional SIM swap and tethering indicators. Must handle the new optional TCM email address attribute in the response to the FAN profile stored procedure call. Must vend the optional TCM email address to the treatment service.

CAM—Must transport the optional device "friendly name" (make & model) in response to clients calling for unbilled usage. May be impacted to transport the optional SIM swap and tethering indicators. Must develop a method to permit clients to inquire for all notification notes, or notes by reason code, primary action code, or by another unspecified notes attribute on a subscription during a specified billing cycle.

BASE—Must return the optional TCM email address in the stored procedure call for FAN profile data.

CEF—Must call a method in CAM to inquire for all notification notes, or notes by reason code, primary action code, or by another unspecified notes attribute on a subscription during a specified billing cycle.

TLG API—Must transport the optional device "friendly name" (make & model) in response to clients calling for unbilled usage. May be impacted to transport the optional SIM swap and tethering indicators.

BID—Must provide reports to be specified by the Business.

Fraud Data Transformer—Must receive Data Roaming threshold events generated by CTS Clarify—Must be able to open tickets and resolve issues related to this program. Must be able to call CTS for historical treatment.

iPOS—Must transport the optional device "friendly name" (make & model) in response to clients calling for unbilled usage. May be impacted to transport the optional SIM swap and tethering indicators.

System X—Applications that have billed and unbilled screens must display the differential rate when applied. If not currently doing so, must display the friendly device name used to generate the differential charge and the SIM swap and/or tethering indicators when present. Provide a pop-up dialogue box when CSR adds or removes an exemption feature. Provide a pop-up dialogue box when CSR removes a data suspension SOC/feature. The pop-ups should be acknowledged by selecting a checkbox.

Oasys/Centaur—Must accept the exemption product(s) category attribute to enable the display of the information dialogue box to the Rep. This attribute will be stored locally with other product data coming from SID.

With reference now to FIG. 5, illustration 500 depicts an exemplary decision path associated with a particular SOC. Accordingly, illustration 500 assumes the case of a particular service agreement and/or SOC, here denoted as SOC=1, as indicated by reference numeral 502. Under such a service plan, if the location of data usage is from the subscriber's home, then the decision path flows as indicated by reference numeral 504. However, if the location is described by domestic off-net and/or roaming, or international, then flow traverses paths 506 or 508, respectively.

Since each decision path represents a distinct type of data usage, thresholds can be set accordingly. In this case, for home data usage, example thresholds are set at 500 KB per day or 10,000 KB per billing cycle; for roaming, example thresholds are set at 100 KB per day or 2,000 KB per billing cycle; and for international, settings are for 25 KB per day or 500 KB per billing cycle as denoted by reference numerals 510, 512, and 514, respectively. If any such threshold is breached, which can be determined by the Enabler, then flow can proceed to the DUCS system, wherein treatment 304 can be determined for any given case. Thus, at reference numeral 516, 518, 520, suitable treatment 304 can be determined such as sending notification 306, adjusting usage (e.g., via update 312), adding a note, adding a SOC or feature (e.g., also via update 312), creating audit trail 408 and so forth.

However, it should be appreciated that applying treatment 304 can be first premised on certain exemptions or the like. Thus, if the subscriber meets criteria associated with exemption 522, 524, or 526, the treatment 304 need not be applied. However, if not, then treatment 304 can be applied, or in some cases no treatment, but with an audit trail instantiated, at reference numerals 528, 530, or 532.

Figure 6:
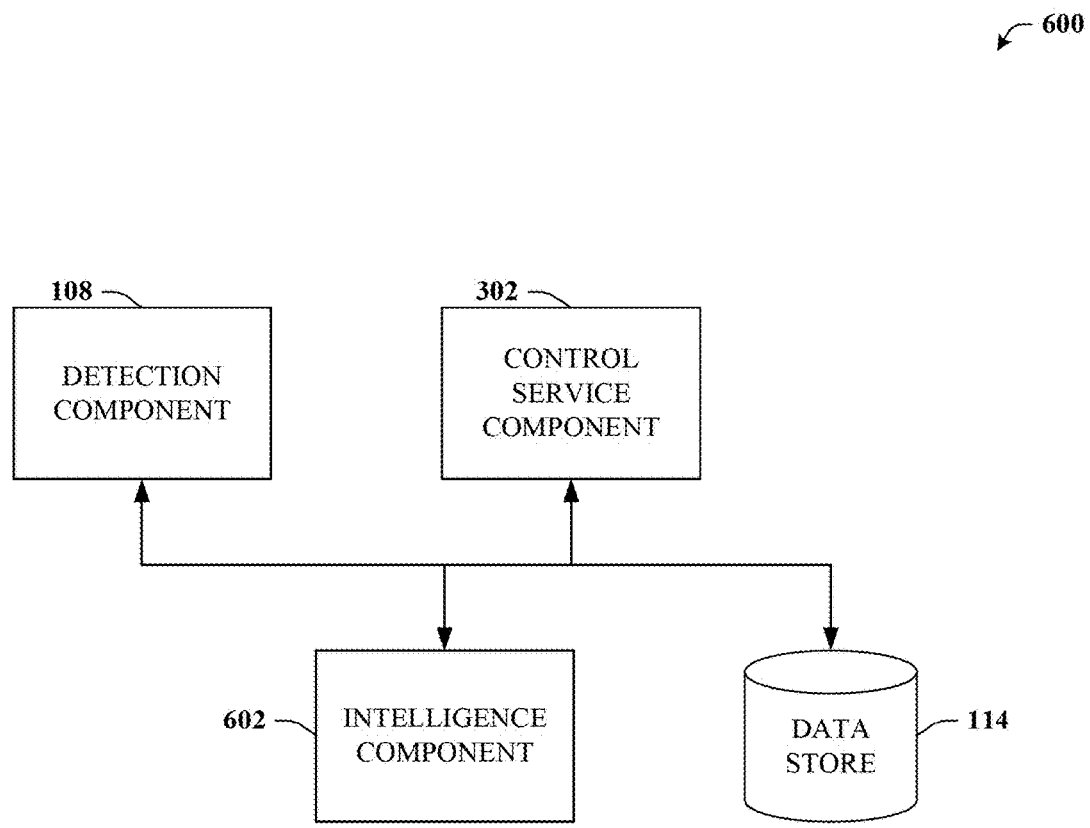
FIG. 6 illustrates a block diagram of a system that can perform or aid with various determinations or inferences

Now turning to FIG. 6, system 600 that can perform or aid with various determinations or inferences is illustrated. Generally, system 600 can include detection component 108 and control service component 302 as substantially described herein. In addition to what has been described, the above-mentioned components can make intelligent determinations or inferences. For example, Bayesian probabilities or confidence measures can be employed or inferences can be based upon machine learning techniques related to historical analysis, feedback, and/or previous determinations or inferences.

For instance, detection component 108 can intelligently determine or infer when to issue usage inequity 110 as well as other suitable inferences relating to detecting or evaluating data usage, service plans or features, or the like. Similarly, control service component 302 can intelligently determine or infer suitable treatment 304, when or whether to apply treatment 304, whether or not to initiate an audit trail, and so forth. It should be understood, determinations or inferences detailed herein can themselves rely upon previous or base intelligent determinations or inferences.

In addition, system 600 can also include intelligence component 602 that can provide for or aid in various inferences or determinations. In particular, in accordance with or in addition to what has been described supra with respect to intelligent determinations or inferences provided by various components described herein, e.g., all or portions of detection component 108 or control service component 302 and/or Enabler or DUCS. Additionally, or alternatively, all or portions of intelligence component 602 can be included in one or more components described herein. Moreover, intelligence component 602 will typically have access to all or portions of data sets described herein, such as data store 114.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
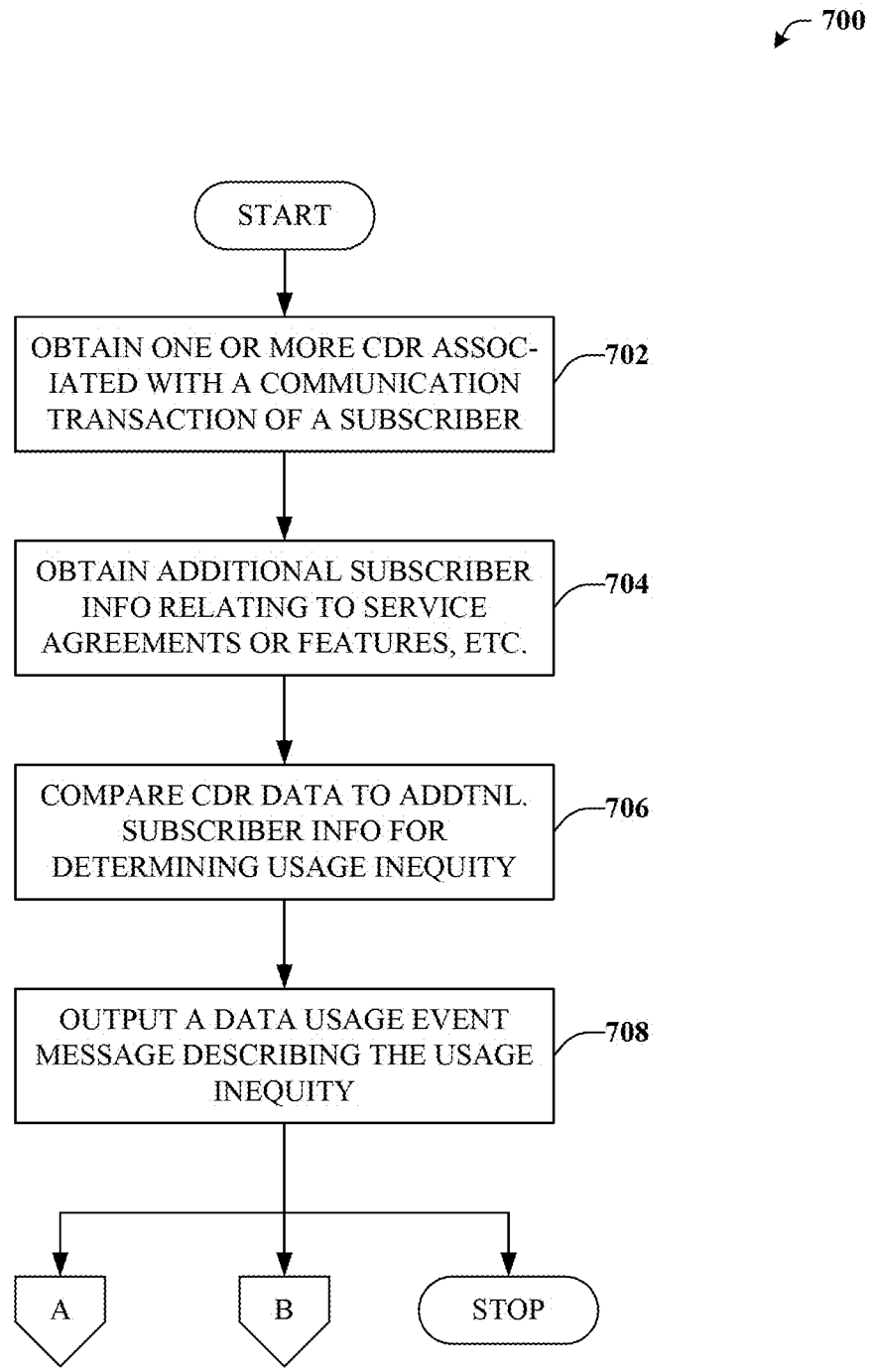
FIG. 7 is an exemplary flow chart of procedures that define a method for automatically or dynamically detecting or remedying service usage inequities for a communications network.
Figure 8:
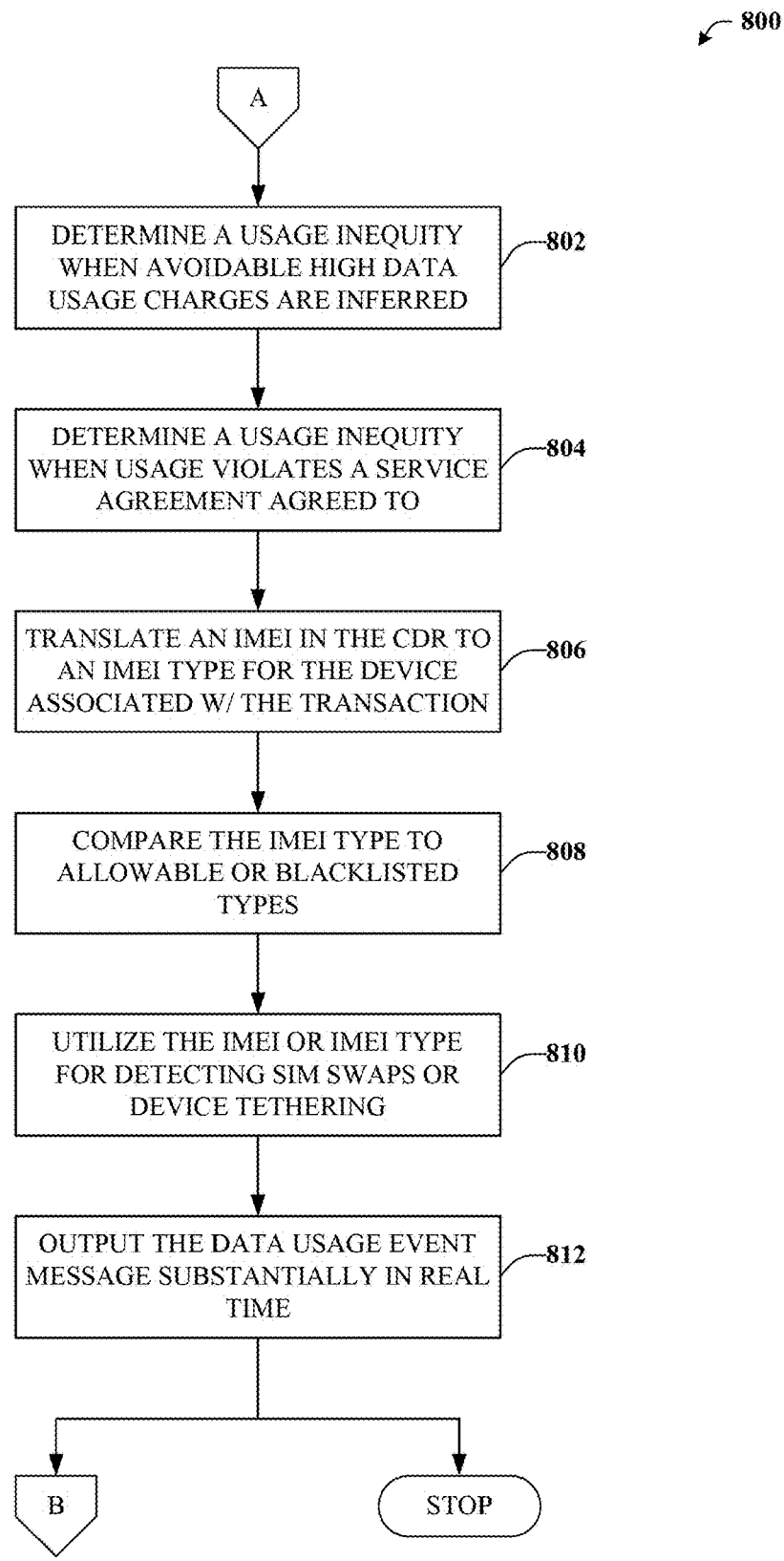
FIG. 8 is an exemplary flow chart of procedures that define a method for providing various additional features or aspects in connection with identifying a usage inequity or other Enabler functionality.
Figure 9:
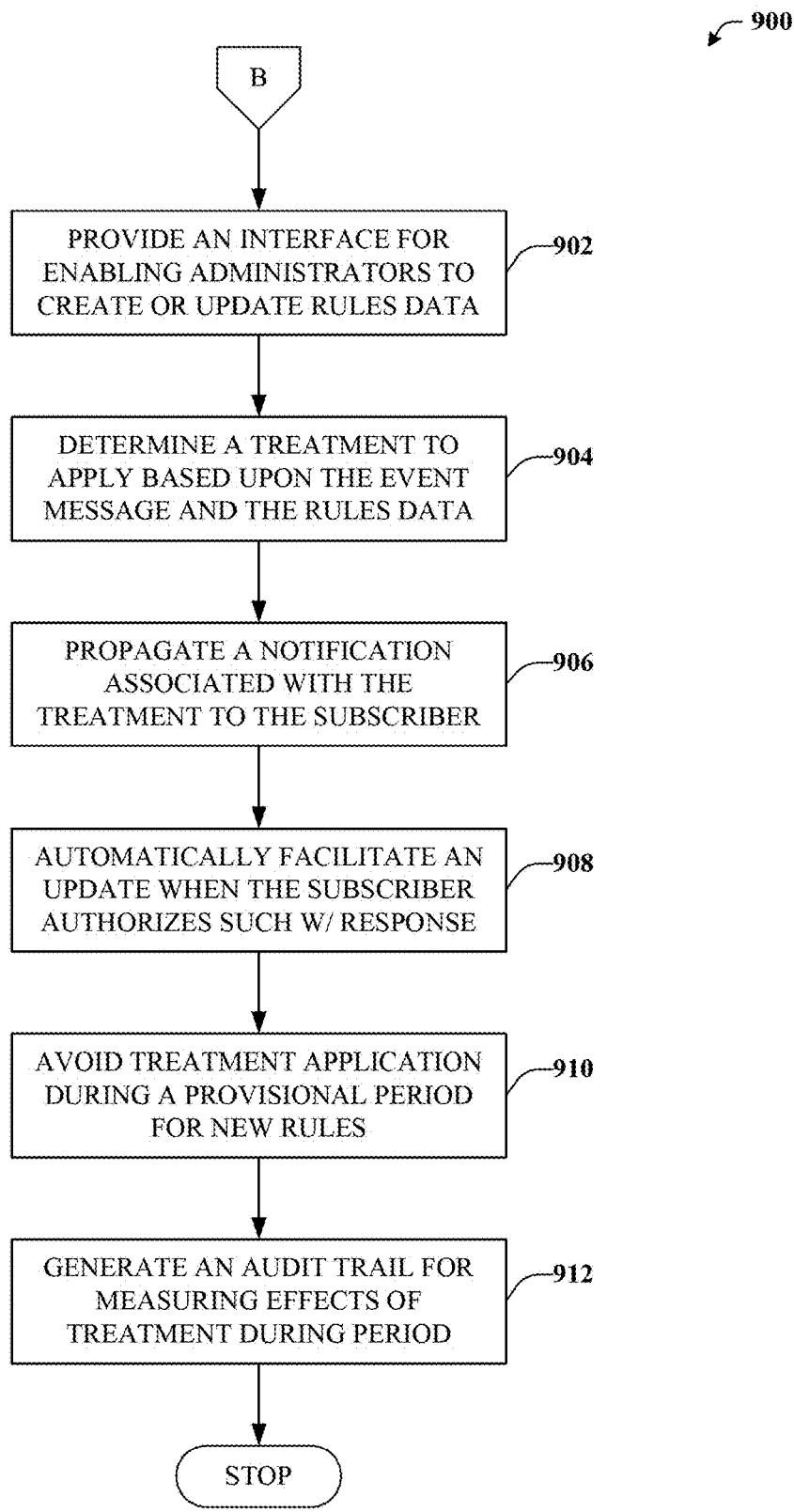
FIG. 9 depicts an exemplary flow chart of procedures defining a method for providing various addition features or aspects in connection with determining treatment or other DUCS functionality.

FIGS. 7, 8, and 9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 7, an exemplary method 700 for automatically or dynamically detecting or remedying service usage inequities for a communications network is illustrated. Generally, at reference numeral 702, one or more CDR associated with a communication transaction of a subscriber to the communications network can be obtained. The communication transaction can relate to either voice or data. For example, the communication transaction can be a call session, a data session, and so forth.

In addition, at reference numeral 704, additional subscriber information relating to service agreements or to features, options, terms, conditions, or rules data related thereto can be obtains. Accordingly, at reference numeral 706, CDR data relating to communication transactions obtain in connection with reference numeral 702 can be compared to the additional subscriber information obtained in connection with reference numeral 704. Based upon this comparison, a usage inequity can be identified. Thus, at reference numeral 708, a data usage event message describing the usage inequity can be output.

With reference now FIG. 8, exemplary method 800 for providing various additional features or aspects in connection with identifying a usage inequity or other Enabler functionality is illustrated. At reference numeral 802, the usage inequity determined at reference numeral 706 can be determined when avoidable high data usage charges are inferred to arise during a current billing cycle. Such can relate to potential or forecasted overages charges or the like. Similarly, at reference numeral 804, the usage inequity can be determined when usage of the communication network violates a provisioned service agreement agreed to by the subscriber.

For example, usage that violates a provisioned service agreement can be determined according to reference numeral 806, which provides that an International Mobile Equipment Identifier (IMEI) included in the CDR retrieved at reference numeral 702 can be translated to an IMEI Type that indicates a type or class of equipment employed for the communication transaction associated with the CDR. Hence, at reference numeral 808, the IMEI Type can be compared to allowable equipment included in the additional subscriber information obtained in connection with reference numeral 704 or to a blacklist equipment list particular to a service agreement associated with the subscriber.

At reference numeral 810, the IMEI can be utilized for detecting an unauthorized subscriber information module (SIM) swap of for detecting an unauthorized communication-based device tethering. At reference numeral 812, the data usage event message can be output substantially in real time.

Turning briefly to FIG. 9, an exemplary method 900 for providing various addition features or aspects in connection with determining treatment or other DUCS functionality is depicted. At reference numeral 902, an interface for enabling authorized administrators can be provided, enabling creation of or update to rules data. Rules data can be stored for later access or recall.

For example, at reference numeral 904, a treatment to apply can be determined based upon the data usage event message and the rules data. The treatment can relate to, e.g., a notification to the subscriber, wherein the notification includes one or more of the usage inequity, suggested remedies, potential actions should the usage inequity continue, or further contact information; additional or more detailed monitoring of data usages associated with the subscriber; a restriction to data usage or services associated with the subscriber; a termination of data usage or services associated with the subscriber, and so on.

Regardless of the particular treatment determined or inferred, but assuming such treatment at least includes a determination that a notification is suitable, then at reference numeral 906, the notification can be propagated to the subscriber by way of at least one of SMS, email, or mail. Furthermore, at reference numeral 908, an update to a provisioned service or to an agreement thereof or to associated features can be automatically facilitated, e.g., when the subscriber authorizes the update or requests an exemption in response to the notification provided at reference numeral 906. For instance, the notification can indicate that the subscriber can potentially save money by upgrading or downgrading his or her service. Along with this notification, a request for the subscriber to authorize the change can be provided as well, allowing the subscriber to, e.g., select "I agree" or the like, and return this authorization via SMS or another way. As another example, the notification can indicate a usage violation due to, say, a SIM swap to an unauthorized device. Rather than being subject to various treatments, the subscriber can instead request an exemption, with can be agreed to, generally at the discretion of the host network, although potentially based upon an inference or rule.

At reference numeral 910, application of treatment (e.g., treatment determined in connection with reference numeral 904) can be avoided or ignored, especially in the case of a newly created or newly updated rule to provide a "soak" period for the rule or update. During this provisional or "soak" period, or for other reasons, at reference numeral 912, an audit trail for measuring or tracking the effects of treatment (e.g., what treat can potentially remedy or mitigate) defined by the newly created or newly updated rule.

Figure 10:
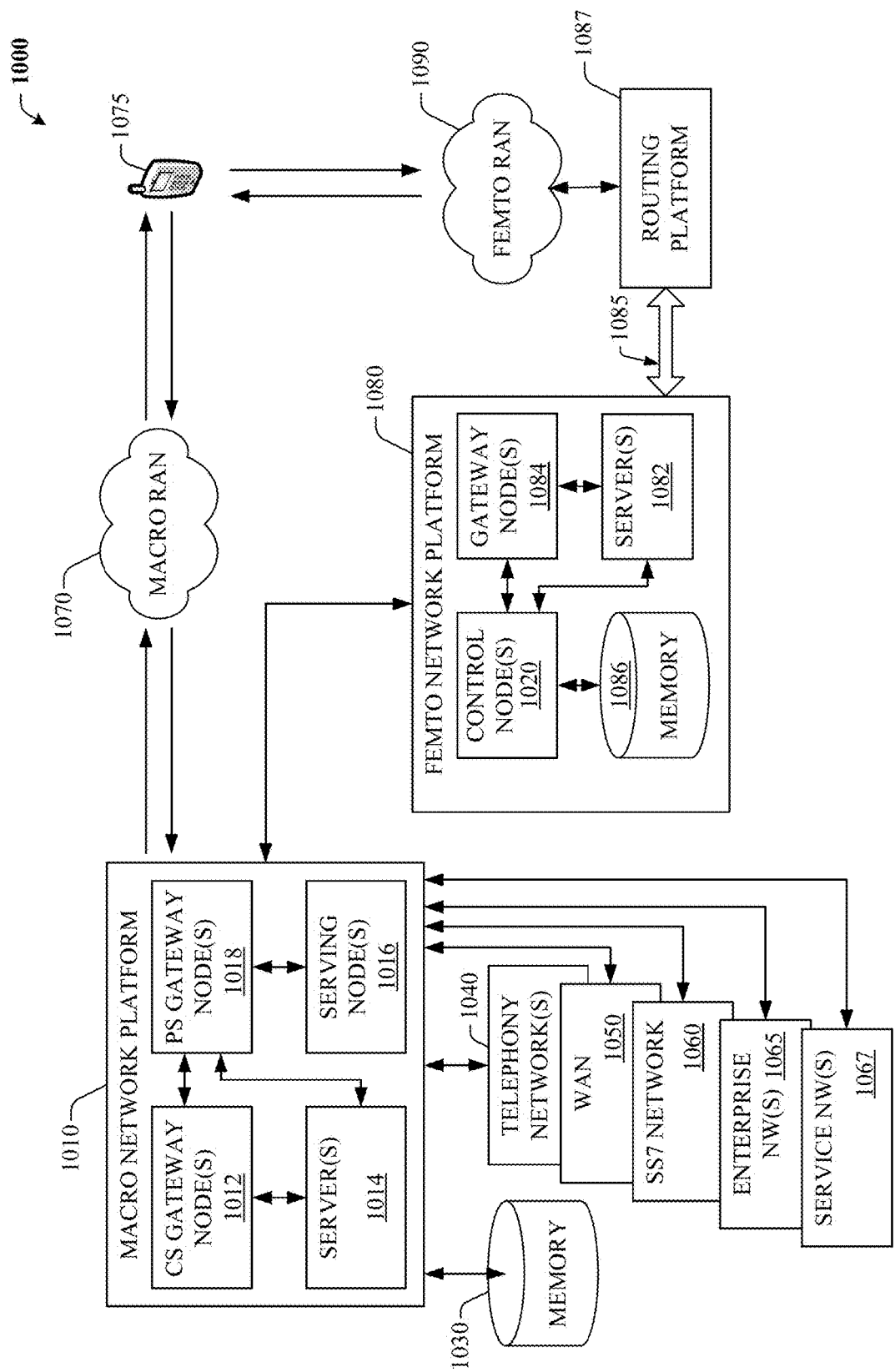
FIG. 10 illustrates an example wireless communication environment with associated components that can enable operation of an enterprise network in accordance with aspects described herein.

To provide further context for various aspects of the subject specification, FIG. 10 illustrates an example wireless communication environment 1000, with associated components that can enable operation of a femtocell enterprise network in accordance with aspects described herein. Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 4G, 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090, linked to the femto network platform 1080 through a routing platform 102 via backhaul pipe(s) 1085, wherein backhaul pipe(s) are substantially the same a backhaul link 3853 below. It should be appreciated that femto network platform 1080 typically offloads UE 1075 from macro network, once UE 1075 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 1205, while femto RAN 1090 can comprise multiple femto access points. As mentioned above, it is to be appreciated that deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1012 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, gateway node(s) 1018 can be embodied in gateway GPRS support node(s) (GGSN).

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. To that end, in an aspect, gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node(s) 1016 that convey the various packetized flows of information or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to gateway node(s) 1018 for authorization/authentication and initiation of a data session, and to serving node(s) 1016 for communication thereafter. Server(s) 1014 can also effect security (e.g., implement one or more firewalls) of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060, enterprise NW(s) 1065, or service NW(s) 1067.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Further, control node(s) 1020 can receive handover requests and relay them to a handover component (not shown) via gateway node(s) 1084. According to an aspect, control node(s) 1020 can support RNC capabilities and can be substantially similar to the control component 320 (FIG. 3) and can include functionality thereof.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based) it generates in addition to data received from macro network platform 1010. It is to be noted that server(s) 1082 can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femto cell configuration (e.g., devices served through femto RAN 1090; access control lists, or white lists); service policies and specifications; privacy policies; add-on features; and so forth.

It is noted that femto network platform 1080 and macro network platform 1010 can be functionally connected through one or more reference link(s) or reference interface(s). In addition, femto network platform 1080 can be functionally coupled directly (not illustrated) to one or more of external network(s) 1040, 1050, 1060, 1065 or 1067. Reference link(s) or interface(s) can functionally link at least one of gateway node(s) 1084 or server(s) 1086 to the one or more external networks 1040, 1050, 1060, 1065 or 1067.

Figure 11:
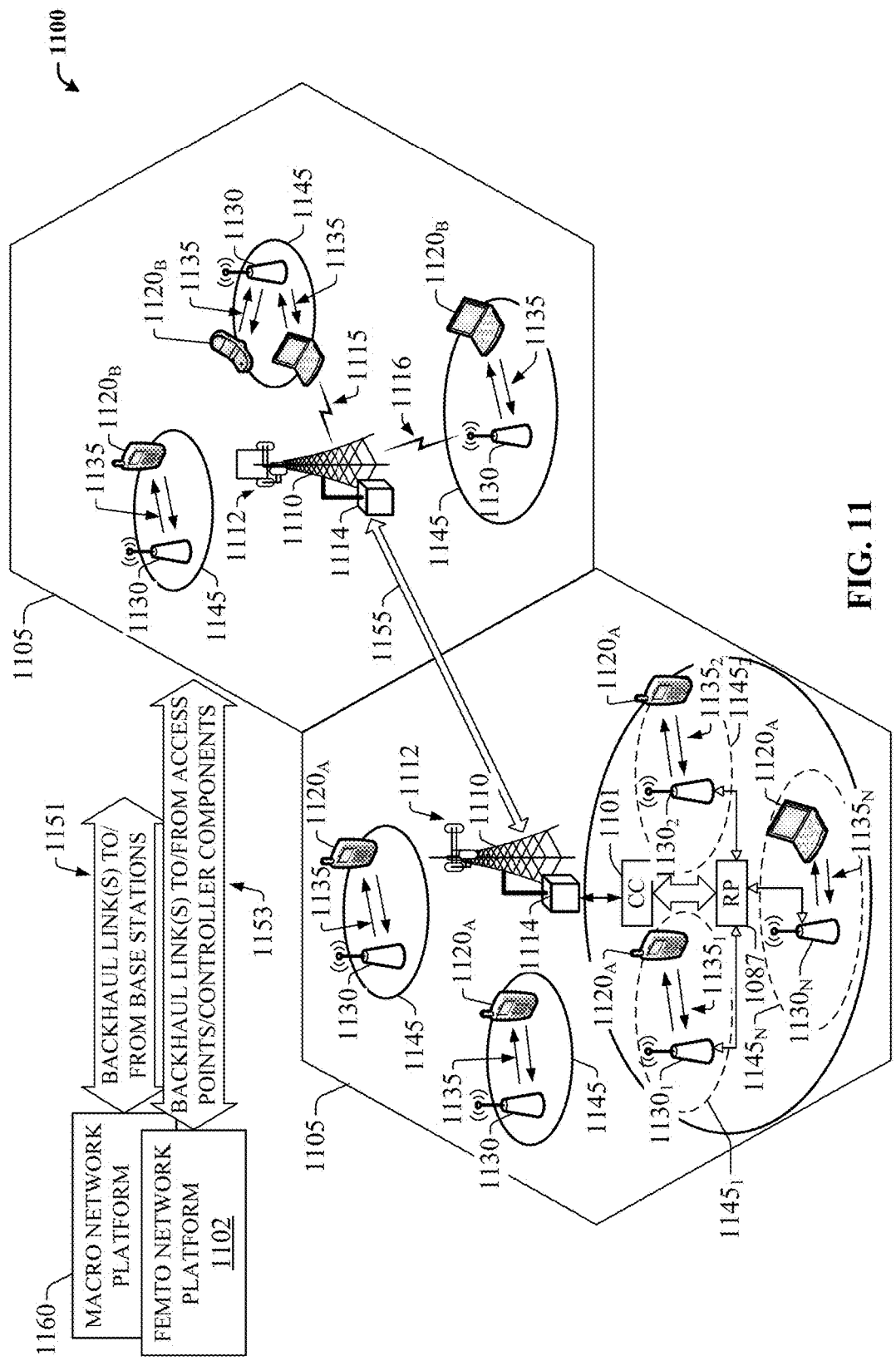
FIG. 11 illustrates a schematic deployment of a macro cell for wireless coverage in accordance with aspects of the subject specification.

FIG. 11 illustrates a wireless environment that includes macro cells and femtocells for wireless coverage in accordance with aspects described herein. In wireless environment 1150, two areas 1105 represent "macro" cell coverage, each macro cell is served by a base station 1110. It can be appreciated that macro cell coverage area 1105 and base station 1110 can include functionality, as more fully described herein, for example, with regard to system 1100. Macro coverage is generally intended to serve mobile wireless devices, like UE 1120$_A$, 1120$_B$, in outdoors locations. An over-the-air wireless link 115 provides such coverage, the wireless link 1215 comprises a downlink (DL) and an uplink (UL), and utilizes a predetermined band, licensed or unlicensed, of the radio frequency (RF) spectrum. As an example, UE 1120$_A$, 1120$_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1110 communicates via backhaul link(s) 1151 with a macro network platform 1160, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1160 controls a set of base stations 1110 that serve either respective cells or a number of sectors within such cells. Base station 1110 comprises radio equipment 1114 for operation in one or more radio technologies, and a set of antennas 1112 (e.g., smart antennas, microwave antennas, satellite dish(es) . . . ) that can serve one or more sectors within a macro cell 1105. It is noted that a set of radio network control node(s), which can be a part of macro network platform; a set of base stations (e.g., Node B 1110) that serve a set of macro cells 1105; electronics, circuitry or components associated with the base stations in the set of base stations; a set of respective OTA wireless links (e.g., links 1115 or 1116) operated in accordance to a radio technology through the base stations; and backhaul link(s) 1155 and 1151 form a macro radio access network (RAN). Macro network platform 1160 also communicates with other base stations (not shown) that serve other cells (not shown). Backhaul link(s) 1151 or 1153 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1155 link disparate base stations 1110. According to an aspect, backhaul link 1153 can connect multiple femto access points 1130 and/or controller components (CC) 1101 to the femto network platform 1102. In one example, multiple femto APs can be connected to a routing platform (RP)

1087, which in turn can be connect to a controller component (CC) 1101. Typically, the information from UEs 1120$_A$ can be routed by the RP 102, for example, internally, to another UE 1120$_A$ connected to a disparate femto AP connected to the RP 1087, or, externally, to the femto network platform 1102 via the CC 1101, as discussed in detail supra.

In wireless environment 1150, within one or more macro cell(s) 1105, a set of femtocells 1145 served by respective femto access points (APs) 1130 can be deployed. It can be appreciated that, aspects of the subject innovation are geared to femtocell deployments with substantive femto AP density, e.g., $10^4$-$10^7$ femto APs 1130 per base station 1110. According to an aspect, a set of femto access points 1130$_1$-3730$_N$, with N a natural number, can be functionally connected to a routing platform 1087, which can be functionally coupled to a controller component 1101. The controller component 1101 can be operationally linked to the femto network platform 330 by employing backhaul link(s) 1153. Accordingly, UEs UE 3720$_A$ connected to femto APs 1130$_1$-3830$_N$ can communicate internally within the femto enterprise via the routing platform (RP) 1087 and/or can also communicate with the femto network platform 1102 via the RP 1087, controller component 1101 and the backhaul link(s) 1153. It can be appreciated that although only one femto enterprise is depicted in FIG. 11, multiple femto enterprise networks can be deployed within a macro cell 1105.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 12:
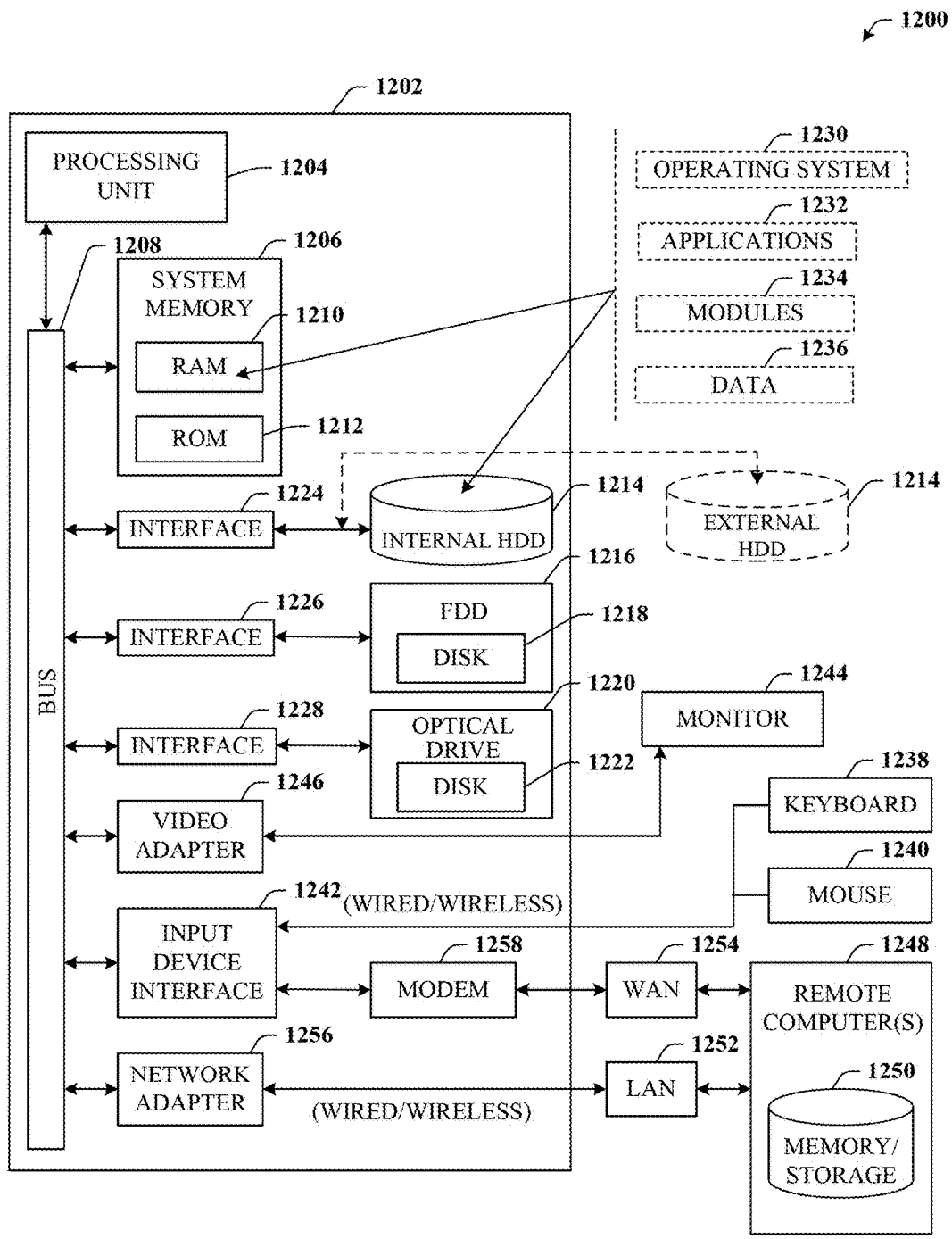
FIG. 12 illustrates a block diagram of a computer operable to execute a portion of the disclosed architecture.

Referring now to FIG. 12, there is illustrated a block diagram of an exemplary computer system operable to execute the disclosed architecture. In order to provide additional context for various aspects of the disclosed subject matter, FIG. 12 and the following discussion are intended to provide a brief, general description of a suitable computing environment 1200 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the disclosed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the disclosed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ). Additionally, it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the disclosed subject matter.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A network device, comprising:
    a processor; and
    a memory that stores executable instructions that, when executed by the processor, facilitate performance of operations, comprising:
        receiving first data representative of a call detail record that is generated in response to a determination a first subscriber device accessed a network service;
        determining, based on the first data, that a second subscriber device accessed the network service via the first subscriber device;
        in response to examining second data representative of a service agreement between a provider entity that provides the network service and a subscriber entity associated with the first subscriber device, determining that a usage violation has occurred, wherein the usage violation is representative of a determination that the second subscriber device is not authorized by the service agreement to access the network service; and
        in response to the determining that the usage violation has occurred, implementing a violation policy in connection with access to the network service by the first subscriber device.

2. The network device of claim 1, wherein the operations further comprise transmitting instruction data in accordance with the violation policy, and wherein the instruction data is representative of an instruction to monitor call detail records, generated in response to the first subscriber device accessing the network service, in a manner described by the violation policy.

3. The network device of claim 2, wherein the instruction is a first instruction and the instruction data further comprises a second instruction to create an audit record of the call detail records generated during an audit period described by the violation policy.

4. The network device of claim 3, wherein the operations further comprise determining, based on an examination of the audit record, cost data representative of a cost of the usage violation during the audit period.

5. The network device of claim 4, wherein the operations further comprise, based on the cost data, determining treatment data representative of a recommended response to the usage violation.

6. The network device of claim 5, wherein the recommended response comprises a recommendation to take no further action in response to a value of the cost data being determined to be below a defined threshold.

7. The network device of claim 5, wherein the recommended response comprises a recommendation to transmit notification data to the first subscriber device in accordance with the violation policy, and wherein the notification data is representative of a notification that the second subscriber device is not authorized by the service agreement to access the network service.

8. The network device of claim 7, wherein the notification data is transmitted to the first subscriber device via a short message service.

9. The network device of claim 7, wherein the notification data comprises information regarding authorizing the second subscriber device to access the network service.

10. A method, comprising:
receiving, by a device comprising a processor, first data representative of a call detail record that is generated in response to a determination a first subscriber device accessed a network service;
based on the first data, determining, by the device, that a second subscriber device accessed the network service via the first subscriber device;
in response to examining second data representative of a service agreement between a provider entity that provides the network service and a subscriber entity associated with the first subscriber device, determining, by the device, that a usage violation has occurred, wherein the usage violation is in response to a determination that the second subscriber device is not authorized by the service agreement to access the network service; and
in response to the determining that the usage violation has occurred, implementing, by the device, a violation policy in connection with access to the network service by the first subscriber device.

11. The method of claim 10, further comprising transmitting, by the device, instruction data in accordance with the violation policy, wherein the instruction data is representative of an instruction to monitor, in a manner described by the violation policy, call detail records generated in response to the first subscriber device accessing the network service.

12. The method of claim 11, wherein the instruction is a first instruction and the instruction data further comprises a second instruction to create an audit record of the call detail records generated during an audit period described by the violation policy.

13. The method of claim 12, further comprising, based on an examination of the audit record, determining, by the device, cost data representative of a cost of the usage violation during the audit period.

14. The method of claim 13, further comprising, based on the cost data, determining, by the device, treatment data representative of a recommended response to the usage violation.

15. A non-transitory machine-readable medium, comprising executable instructions that, when executed by a processor, facilitate performance of operations, comprising:
receiving first data representative of a call detail record that is generated in response to a determination a first subscriber device accessed a network service;
based on the first data, determining that a second subscriber device accessed the network service via the first subscriber device;
in response to examining second data representative of a service agreement between a provider entity that provides the network service and a subscriber entity associated with the first subscriber device, determining that a usage violation has occurred, wherein the usage violation is determined to have occurred in response to a determination that the second subscriber device is not authorized by the service agreement to access the network service; and
in response to the determining that the usage violation has occurred, implementing, by the system, a violation policy in connection with access to the network service by the first subscriber device.

16. The non-transitory machine-readable medium of claim 15, wherein the operations further comprise transmitting instruction data in accordance with the violation policy, and wherein the instruction data is representative of an instruction to monitor, in a manner described by the violation policy, call detail records generated in response to the first subscriber device accessing the network service.

17. The non-transitory machine-readable medium of claim 16, wherein the instruction is a first instruction, and wherein the instruction data further comprises a second instruction to create an audit record of the call detail records generated during an audit period described by the violation policy.

18. The non-transitory machine-readable medium of claim 17, wherein the operations further comprise, based on an examination of the audit record, determining cost data representative of a cost of the usage violation during the audit period.

19. The non-transitory machine-readable medium of claim 18, wherein the operations further comprise, based on the cost data, determining treatment data representative of a recommended response to the usage violation.

20. The non-transitory machine-readable medium of claim 19, wherein the recommended response comprises a recommendation to take no further action in response to a value of the cost data being determined to be below a defined threshold.

* * * * *